(12) United States Patent
Ronk et al.

(10) Patent No.: US 7,386,170 B2
(45) Date of Patent: Jun. 10, 2008

(54) IMAGE OBJECT RANKING

(75) Inventors: Lawrence J. Ronk, Dallas, TX (US); Bruce E. Flinchbaugh, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1405 days.

(21) Appl. No.: 09/896,503

(22) Filed: Jun. 29, 2001

(65) Prior Publication Data
US 2002/0057343 A1    May 16, 2002

Related U.S. Application Data

(60) Provisional application No. 60/215,248, filed on Jun. 30, 2000.

(51) Int. Cl.
G06K 9/46   (2006.01)
H04N 5/14   (2006.01)

(52) U.S. Cl. ........................ 382/190; 348/699
(58) Field of Classification Search ........... 382/162, 382/168, 173, 181, 190, 203, 305, 312, 165, 382/103, 145; 348/169, 148, 143, 699; 707/100, 707/4; 375/240.12
See application file for complete search history.

(56) References Cited

U.S. PATENT DOCUMENTS

| | | | | |
|---|---|---|---|---|
| 5,103,305 A | * | 4/1992 | Watanabe | 382/236 |
| 5,109,435 A | * | 4/1992 | Lo et al. | 382/103 |
| 5,724,435 A | * | 3/1998 | Malzbender | 382/103 |
| 5,748,775 A | * | 5/1998 | Tsuchikawa et al. | 382/190 |
| 5,969,772 A | * | 10/1999 | Saeki | 348/699 |
| 6,289,110 B1 | * | 9/2001 | Kim et al. | 382/103 |
| 6,462,773 B1 | * | 10/2002 | Koga | 348/143 |
| 6,584,221 B1 | * | 6/2003 | Moghaddam et al. | 382/165 |
| 6,609,134 B1 | * | 8/2003 | Chang et al. | 707/104.1 |
| 6,658,136 B1 | * | 12/2003 | Brumitt | 382/103 |
| 6,694,311 B1 | * | 2/2004 | Smith | 707/4 |
| 6,711,287 B1 | * | 3/2004 | Iwasaki | 382/165 |
| 6,731,332 B1 | * | 5/2004 | Yasui et al. | 348/148 |
| 6,751,343 B1 | * | 6/2004 | Ferrell et al. | 382/145 |
| 6,901,110 B1 | * | 5/2005 | Tsougarakis et al. | 375/240.12 |

* cited by examiner

*Primary Examiner*—Kanji Patel
(74) *Attorney, Agent, or Firm*—Mirna G. Abyad; Wade J. Brady, III; Frederick J. Telecky, Jr.

(57) ABSTRACT

Automatic vision system object indexing and image database query system using both path-dependent and path-independent features of moving objects within a sequence of images. Feature vectors of both average over frames of an object traversing the field of view plus average over blocks of a grid for a path association. Color histograms may be an included feature.

3 Claims, 19 Drawing Sheets

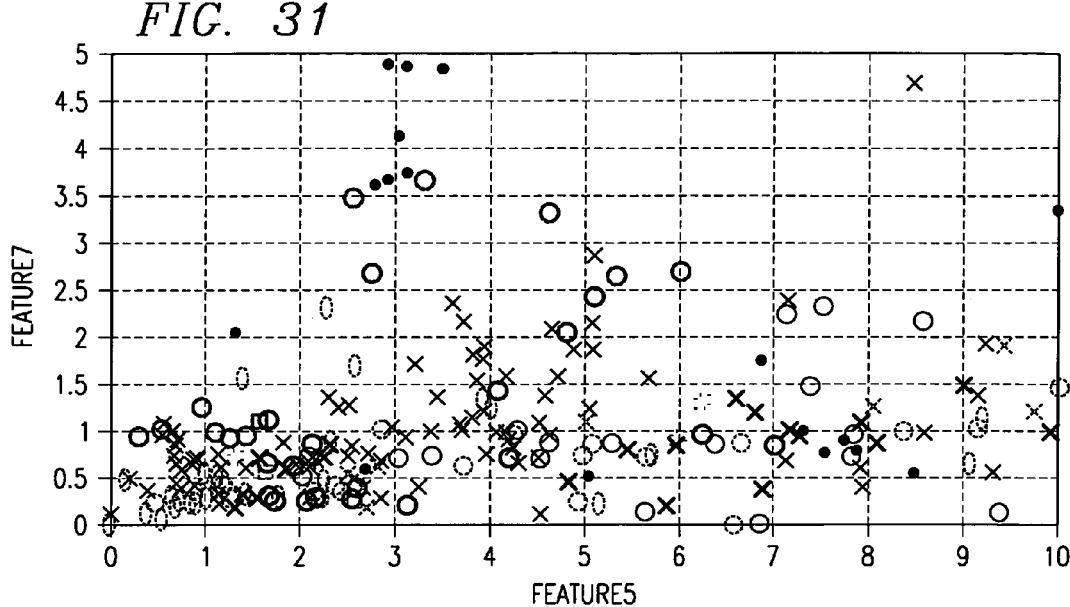
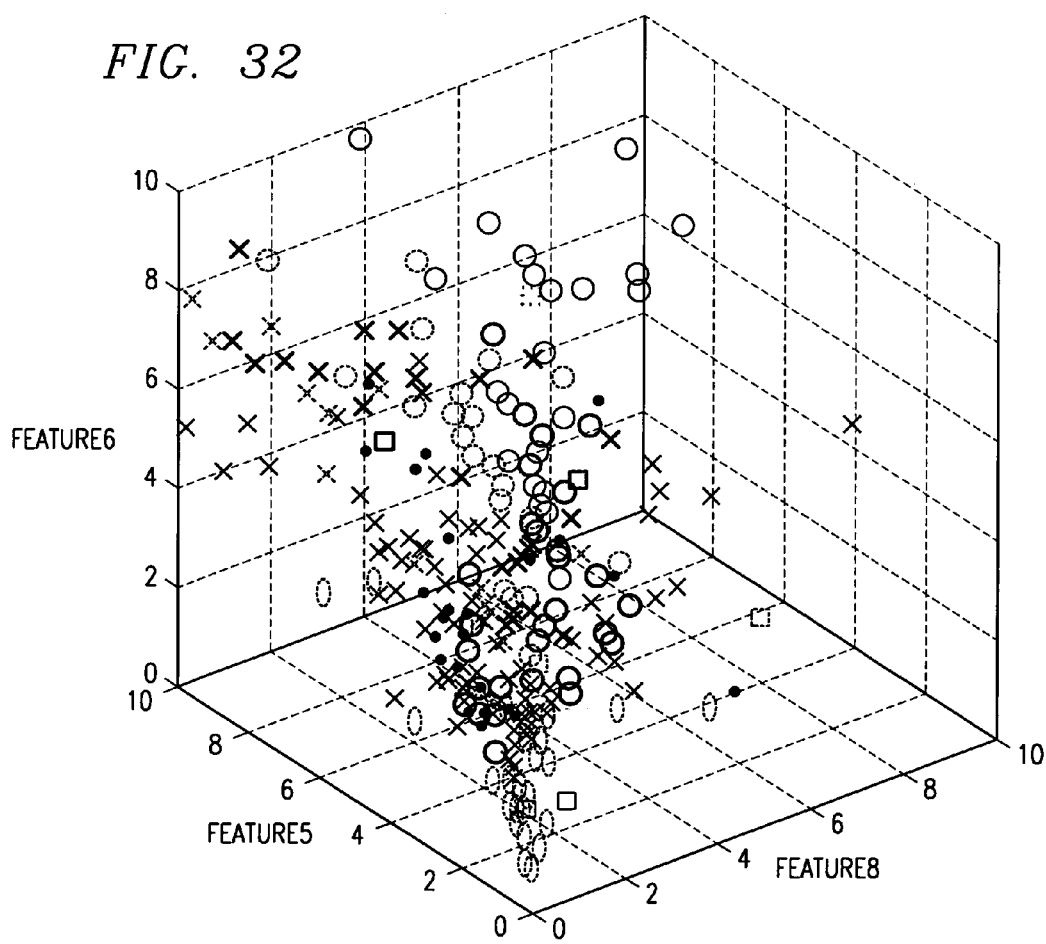

IMAGE OBJECT RANKING

CROSS-REFERENCE TO RELATED APPLICATIONS

This application claims priority from provisional application Ser. No. 60/215,248, filed Jun. 30, 2000.

BACKGROUND OF THE INVENTION

1. Field of the Invention

This invention relates to image processing, and more particularly, to video object tracking and storage and retrieval.

2. Background Art

An image indexing system can be useful in situations that require automatic visual monitoring. A vision system can take a snapshot of each object that occupies the field of view and collect an appropriate set of features for each object in addition to the storage on videotape or digitally on hard drives or rewritable DVDs. At the end of the monitoring an investigator can use image indexing algorithms to search for particular occurrences of an object. An image indexing system allows the investigator to estimate results without having to watch the entire videotape and without having to sequentially view each image in the database.

Image indexing is important because it allows people to quickly retrieve interesting images form large databases. Image databases have become common with the growth of the Internet, advances in video technology, and efficient digital video capture and storage. The technology allows people to automatically monitor scenes and store visual records in databases. In many cases it is time consuming for a human to view each image in the database; and therefore, some computer assistance is necessary to access the images in an efficient manner.

A quality image indexing system reduces the total number of images a user must view before the user sees images of interest. This reduces the amount of time a user must spend sorting through extraneous images. Image indexing algorithms must determine which objects in the database are similar. The algorithm must be robust to varying lighting conditions, varying image resolution, viewing the object from various viewpoints, and distractions present in the object's background. The image indexing technique must also be computationally simple to decrease the time it takes to return information to the user.

The Query By Image Content (QBIC) system allows users to query an image database for scenes, objects or a combination of scenes and objects. Some features used by the system include colors, textures, shapes, and edges. The system is capable of computing similarity using multiple features in combination. The similarity metrics used by QBIC are mostly Euclidean based. The QBIC system does not automatically generate features over the entire video sequence of a particular object. Instead, QBIC relies on features of an object in isolated images. QBIC is capable of two types of image queries: query by object and query by scene. A scene is defined to be a color image or single frame of video. An object is defined to be any part of a scene. Each scene has zero or more objects within it. Also the objects contained in a scene are identified semi-automatically or manually. To segment an object from an image a user outlines the object using QBICS user interface tools. Object features include average color, color histogram, texture, shape, and location within the scene. The features calculated for scenes include average color, color histogram, texture, positional edges, and positional color. A QBIC query can be for an object, a scene, or a combination of objects and scenes.

An object's center of mass in image coordinates is the object's location. Location is normalized by the width and height of the image to account for varying image sizes. To calculate shape features QBIC assumes that a binary mask sufficiently represents shapes, and that the shapes are non-occluded and planar. The shape is represented parametrically using heuristic shape features and moments, Hausdorff distance, parametric curves represented by the curves' spline control points, first and second derivatives of the parametric curves, and turning angles along the object's perimeter.

Texture features include contrast, coarseness, and directionality features. Contrast measures the range of lightness and darkness within a texture pattern. Coarseness measures the relative scale of a texture pattern. The directionality specifies the average direction of the pattern. To quantify color, QBIC calculates a k-element color histogram and uses a three-element vector of average Munsell color coordinates. The color histogram is usually quantized to 64 or 256 bins. The system also allows users to retrieve images based on features extracted from a rough sketch drawn by the user. The sketch is represented by a lower resolution edge map and stored in a 64×64×1 bit array.

Most QBIC features are calculated using weighted Euclidean distance metrics. The weights of each Euclidean component are equal to the inverse variance of each component. To calculate similarity between two color histograms X and Y, QBIC uses a quadratic-form S distance measure. The matrix S is a symmetric, positive definite color similarity matrix that transforms color differences such that distance is directly related to the perceptual difference between colors. This metric is $$\|Z\|=(Z^T S Z)^{1/2},$$

where $Z=X-Y$ and $S>0$.

The similarity measure calculated from parametric spline curves and derivatives calculated from the spline control points using Euclidean distance and quadratic forms with pre-computed terms. To calculate distance between the turning angles, QBIC uses a dynamic programming algorithm.

To calculate the similarity between a user drawn sketch and a scene, QBIC has developed a matching algorithm that compares the drawn edges to the automatically extracted edges.

At the MIT Artificial Intelligence laboratory, Stauffer developed an adaptive, visual tracking system to classify and monitor activities in a scene. As objects traverse the scene, Stauffer's system tracks these objects and records an object's location, speed, direction, and size. The system also stores an image of the object and a binary motion silhouette. The silhouette is obtained from difference imaging. Stauffer's method consists of three main parts, codebook generation, co-occurrence matrix definition, and hierarchical classification.

The first step develops a codebook of representations using Linear Vector Quantization (LVQ) on a large set of data collected by the tracker. A typical codebook size is 400. A codebook uses a set of prototypes to represent each input. After the codebook has been generated, each new input is mapped to symbols defined in the codebook. The input is mapped to the set of symbols that are the shortest distance away from the input. Large codebooks are needed to accurately represent complex inputs. The technique fails if there are not enough symbols to represent measured differences.

As codebook size, M, increases the number of data samples needed to generate working codebooks is on the order of M and the data needed to accumulate co-occurrence statistics is on the order of $M^2$.

After the codebook has been generated, the system creates an M×M co-occurrence matrix. Assuming that there are N classes represented by the data, class c has some prior probability $\Pi_c$ and some probability distribution $p_c(\ )$. The distribution $p_c(\ )$ represents the probability that class c will produce each of the symbols of the prototype. The co-occurrence matrix, C, consists of elements, $C_{i,j}$, such that $C_{i,j}$ is equal to the probability that a pair of symbols $\{O_i, O_j\}$ occur in an equivalency set.

$$C_{i,j} = \sum_k \Pi_k (P_k(O_i) * P_k(O_j)),$$

where $\Pi_k$ is the prior probability of class k, and $P_k$ is the probability mass function (pmf) of class k.

Phase three of Stauffer's system is to separate the sample space into N distinct classes. The method successively splits the co-occurrence matrix into two new co-occurrence matrices, and the result is a full binary tree. The process uses the co-occurrence matrix, calculated in step two, to calculate two new probability mass functions that approximate the co-occurrence matrix. This process continues recursively down the binary tree. Given a co-occurrence matrix with element $C_{i,j}$, the two new pmfs are iteratively solved by minimizing the sum of squared error. Note N=1 in the following equations, since the goal is to split the pmf into two distinct classes.

$$E = \sum_{u,v}^{N} (C_{u,v} - C_{u,v}^e)^2, \text{ when}$$

$$C_{i,j}^e = \sum_c^N \Pi_c (p_c(i) * p_c(j)),$$

$$\Pi_c = (1 - \alpha_\pi) * \Pi_c + (\alpha_\pi) * \sum_{i,j} \Pi_c(p_c(i) * p_c(j)),$$

$$p_c = (1 - \alpha_p) * p_c(i) + (\alpha_p) * \sum_j \Pi_c(p_c(j)).$$

To calculate the co-occurrence matrices of the left and right children the following equations are used, respectively $$C_{i,j}^0 = C_{i,j} * p_0(i) * p_0(j),$$

$$C_{i,j}^1 = C_{i,j} * p_1(i) * p_1(j).$$

Stauffer's method successfully measures similarity in terms of probability instead of Euclidean distances. This allows Stauffer to easily combine multiple features into a single metric. However, Stauffer's method requires a large amount of memory and computing time to create and split co-occurrence matrices and to generate codebook statistics.

A color histogram is a measure of how often each color occurs in an image. Given a discrete m-dimensional color space, the color histogram is obtained by discretizing the colors present in the image and counting the number of times each color occurs in the image. Often the color space has dimension 3, and the image colors mapped to a given discrete color are contained in a 3-dimensional bin centered at that color. A successful color-matching algorithm will overcome most or all of the following problems that often degrade image indexing systems.

Distractions present in the object's background
Occlusions
Viewing the object from various viewpoints
Varying image resolution
Varying lighting conditions Distractions in the object's background occur when parts of the background match the object. Often the military will camouflage tanks and jeeps to match the surrounding terrain. This type of distraction can severely degrade similarity metrics. An object becomes occluded when an object in the foreground blocks all or part of the object. The imaging sensor cannot detect occluded parts of an object. Also, since objects look different from various viewpoints, attempting to compare images of objects captured from different viewpoints can quickly degrade similarity metrics. In such cases multiple models of a particular object may need to be collected for accurate matching. For example, it may be difficult to match an image showing a person facing a camera with a picture of the same person facing away from the camera. Similarity metrics must also be able to identify objects that are rotated and translated within an image. This causes many template-matching algorithms to be computationally expensive.

Changing image resolution can also hinder similarity metrics. As an object's distance from a camera increases, information about that object decreases. It is also difficult for humans to recognize low-resolution images. Varying lighting conditions can cause an object's appearance to change. Lights oscillating at some frequencies cause the specular reflectance of the object to vary with time. Outside brightness and shadow patterns change continuously. Color-constancy algorithms make it possible to perceive a constant color despite light variations. For most color histogram similarity metrics it is desirable to create histograms from color spaces that are uniform, compact, complete, and compatible with human perception of color. Common color spaces include HSV
OPP
RGB
YUV
Munsell system In a uniform color space, distance between colors is directly proportional to the psychological similarity between the colors. A color space is compact when there is a perceptual difference between each color. A complete color space contains all perceptible colors. Finally, color spaces that appeal to the human visual system represent colors in a human perceptual way. Representing colors by hue, saturation, and intensity often does this.

Quantization is an important issue to consider when choosing a color space for object similarity matching via histogram matching. Uniform quantization of individual color space components is the most obvious quantization scheme and most reasonable method when no a prior knowledge of the color space exists. However color distributions are not uniform. Uniform quantization can be inefficient and it can degrade the performance of the similarity metric. Use Vector Quantization (VQ) to quantize the color space in a manner that minimizes the mean-squared quantization error between pixels in the images and pixels in the quantized images. Minimization is based on quantizing the color space into a new set of N color points. Note that this technique becomes impractical for large images databases.

Mathias performed several experiments to determine what combination of color spaces, quantization schemes, and similarity metrics work best for image indexing systems. To evaluate and compare each set, Mathias developed a criterion function based on the number of false negatives, search efficiency, and computational complexity. A false negative occurs when the system has not located every image that contains visually similar colors. Visually similar images correspond to human perceptual similarity. Efficiency measures the average number of images that must be viewed to see a given number of correct images. Computational complexity is measured by the amount of time it takes to calculate similarity metrics and to index the image database. Mathias results showed that histogram intersection and the city-block metric provided the most accurate results with the best response times. These results were obtained when using the HSV color space quantized to 216 bins. Twenty combinations of color spaces, quantization schemes, and similarity metrics were evaluated in the study.

Five similarity metrics were analyzed:
City-block metric
Euclidean metric
Histogram Intersection
Average color distance
Quadratic distance measure
Three-color spaces were analyzed
CIEL*u*v*
HSV
OPP Each space was uniformly quantized. The CIEL*u*v* space was quantized into 4×8×8 partitions, which corresponds to a 256 bin histogram. The HSV space was quantized into 18×3×3 (162 bins) and also 24×3×3 (216 bins). The opponent space was partitioned into 256 bins, where the wb, rb, and by coordinates were divided into 4, 8, and 8 bins respectively.

Histogram Intersection is a similarity metric used to compare an image or object within an image to every model in a database. Given two histograms, P and M, containing n bins, Histogram Intersection is defined as $$d(P,M) = \sum_{l=1}^{n} \min(p_l, m_l).$$

This is the number of pixels from the model, M, that have corresponding pixels of the same color in the image, P. When images contained within the database vary in size the metric is normalized.

$$d(P, M) = \frac{\sum_{l=1}^{n} \min(p_l, m_l)}{\sum_{l=1}^{n} m_l}$$

Histogram Intersection is robust to the following problems that often degrade image indexing algorithms
Distractions present in the object's background
Occlusions
Viewing the object from various viewpoints
Varying image resolution The similarity is only increased when a given pixel has the same color as one of the colors in the model, or when the total number of pixels used to represent that color in the object is less than the number of pixels of that color in the model. The method is robust to scale changes, but not independent of such changes. Histogram Intersection is not robust to varying lighting conditions. Various histogram intersection algorithms employ color constancy techniques.

Histogram Intersection can be related to the city-block similarity metric on an n dimensional feature space. When the histograms are scaled to be the same size, Histogram Intersection is equivalent to the city-block distance metric.

$$1 - d(P, M) = \frac{1}{2T} \sum_{l=1}^{n} |p_l - m_l| \text{ where } T = \sum_{l=1}^{n} p_l = \sum_{l=1}^{n} m_l.$$

However, the foregoing image sorting and matching methods fail to provide a simple object recognition method for an automatic vision system.

SUMMARY OF THE INVENTION

The present invention provides a similarity ranking for objects that traverse the field of view of an imaging sensor by applying similarity metrics to a given set of numeric features, by themselves or in combination, to generate a ranked list of objects. Preferred embodiment vision systems select and store a single image of an object as it traverses the field of view (and accumulate such snapshots to form a database), and provide queries for objects with similar characteristics in the database. A user specifies an object of interest, and the system returns a ranked list of objects that are similar to the user specified object. The data may be collected in real time and processed over an entire video sequence captured as the object occupies the field of view. The characteristics can be physical features, temporal features, spatial features, mechanical features, or any other numeric feature set. The systems may run on the TMS320C6701 digital signal processor.

BRIEF DESCRIPTION OF THE DRAWINGS

FIGS. 26-35 show distances using sets of features.

DETAILED DESCRIPTION OF THE PREFERRED EMBODIMENTS

1. Overview

The preferred embodiment image indexing systems allow searches for particular images within a database by use of similarity metrics to a set of simple features. The extracted features can be temporal features, spatial features, or mechanical features. The features characterize objects that traverse the field of view of a vision system; and can be path-independent or path-dependent. The features (in combination or separately) are compared to determine the similarity between objects. To rank similar objects, similarity is computed using Euclidean and Manhattan distance metrics on all feature vectors, except color. Histogram intersection is used to compute the similarity using the color feature.

Feature data that depends weakly on the object's distance from the camera are filtered and averaged over the entire collected data set. These are called path-independent features. Feature data that depends strongly on the objects' distance from the camera are segmented into subsets corresponding to the object's position within the image. These are called path-dependent features. The path dependent data contained within each subset is averaged to create a vector of average feature values, which correspond to the object's position.

FIGS. 1-4 illustrate some preferred embodiment vision system architectures with the processor (including memory) extracting features from captured video. The query engine and display or monitor is shown as separate from the processor, although they may in fact utilize common hardware, such as a DSP and/or accelerator for computationally-intensive tasks. The feature extraction, image database control, and query applications may all be (at least in part) programs on one or more programmable processors with all of the items, including video capture, connected by a network or integrated on a single chip or board. The size of the image database may demand separate mass storage.

Figure 1:
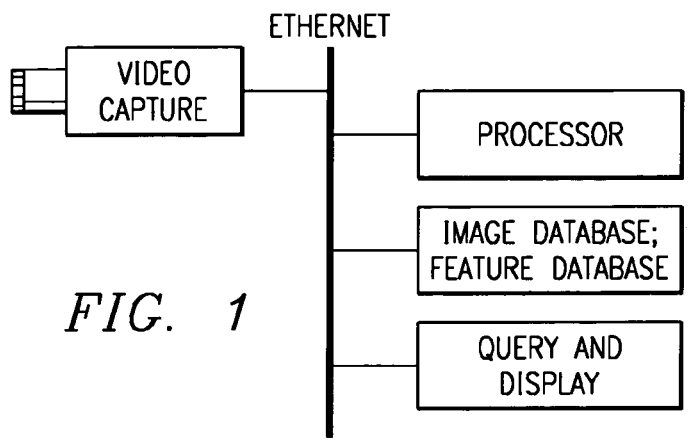
FIGS. 1-4 illustrate various preferred embodiment systems.
Figure 2:
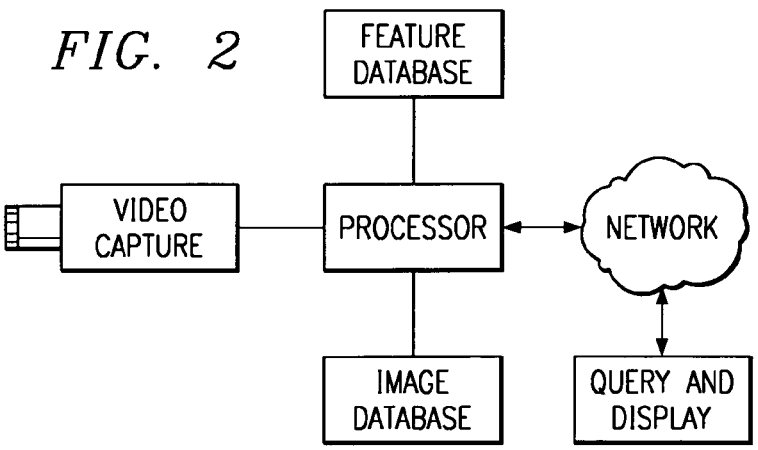
Figure 3:
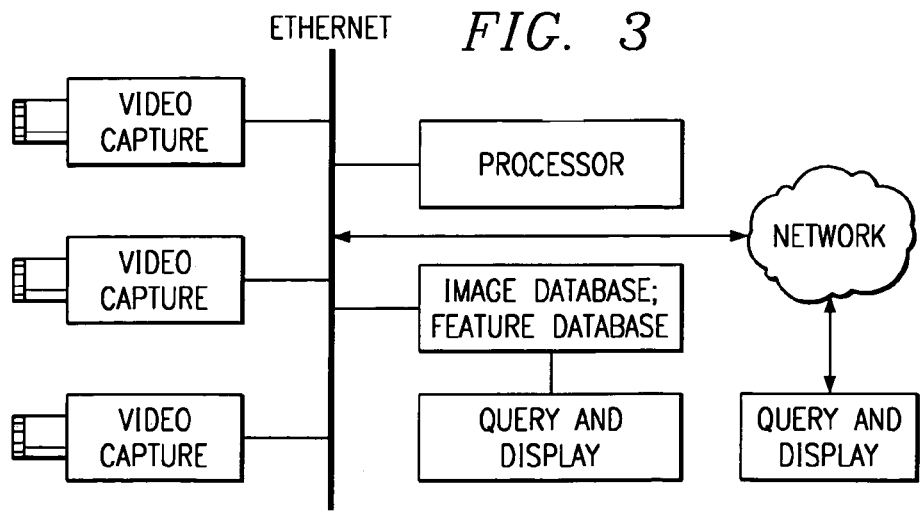
Figure 4:
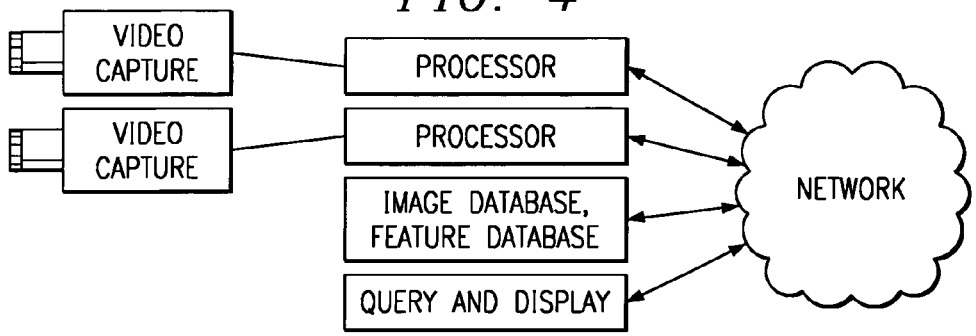
Figure 5:
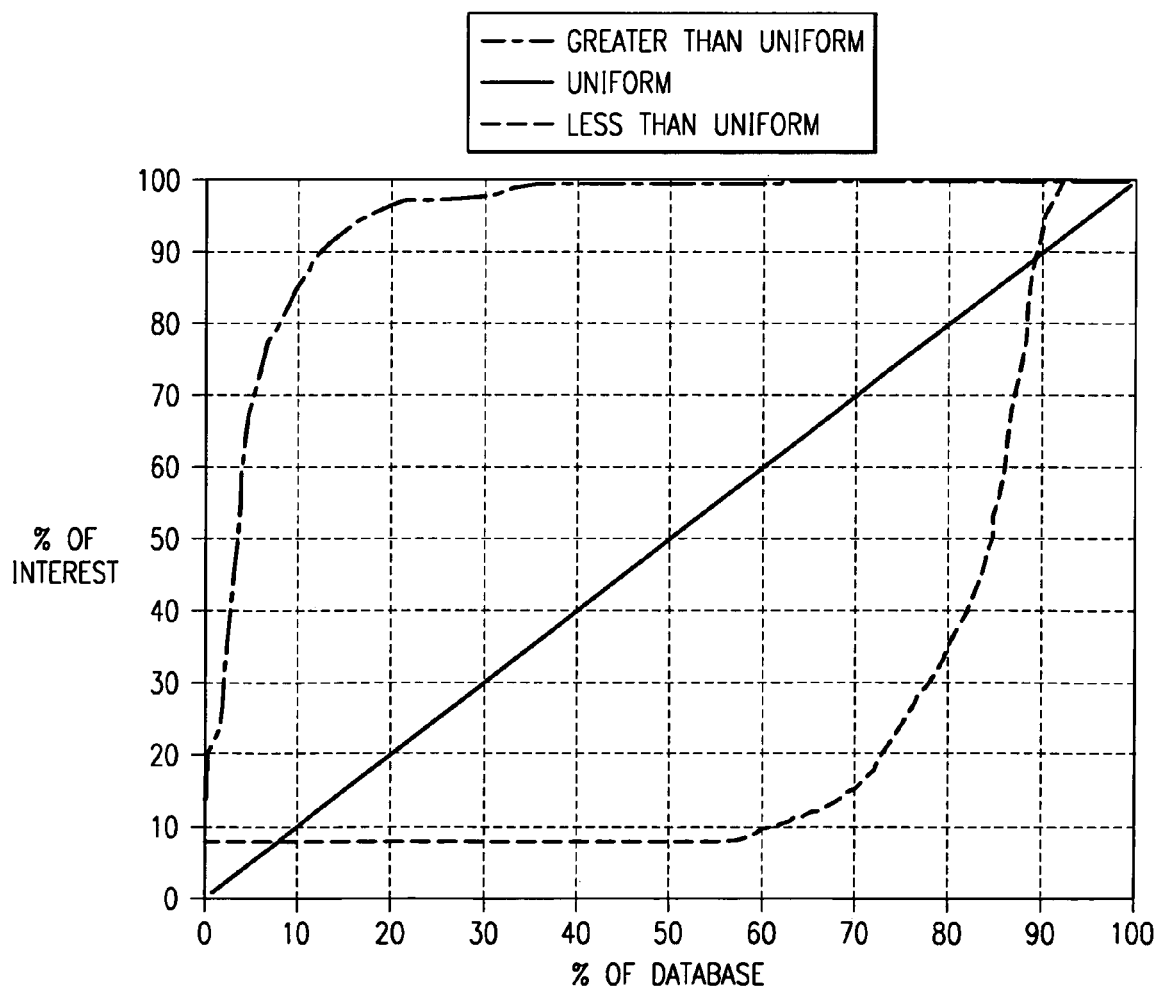
FIG. 5 shows efficiency.

The preferred embodiment image indexing methods reduce the number of images a user must view to find images that are of interest. In the experimental section, performance plots are drawn to illustrate the ability of the similarity metrics to increase the search Efficiency using some set of path-dependent and path-independent features. The Efficiency is defined to be the percentage of images a user actually wanted to see that are contained in a given percentage of the total database. The Efficiency is a function of the percentage of total images in the database. The sketch in FIG. 5 shows Efficiency plotted to illustrate three image indexing scenarios. The straight line represents the average, unsorted case, in which the database is expected to be organized in a uniformly random manner. The curve above the uniform line indicates that the user can expect to search the database at a rate that is greater than uniform. The curve below the uniform line indicates that the user can expect to index the database at a rate that is worse than uniform. The percentage of images of interest found after review of 10% of the database provides a simple quantitative measure of Efficiency.

2. Metrics for Path-dependent Features

Any image feature that is not invariant to an object's position in the camera's field of view is denoted as a path-dependent feature. This type of feature is not expected to stay constant for an object that traversed the field of view. For example, an object's physical dimensions in image coordinates are path dependent features. The size of an object generally increases as the object moves toward the camera and decreases as the object moves away from the camera. The preferred embodiments provide a technique to compute similarity metrics for such path-dependent features. Performance evaluations show that these similarity metrics applied to path-dependent features allow a user to index an image database at a rate that is better than uniform.

Figure 6:
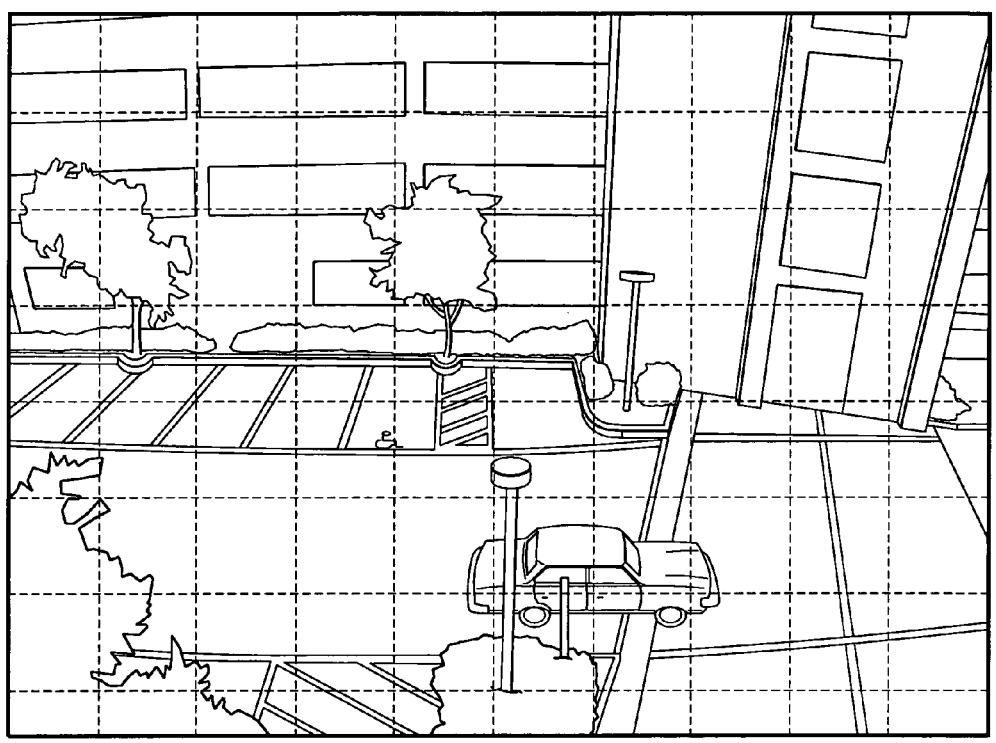
FIGS. 6-7 show experimental scenes.
Figure 7:

Since feature data can depend largely on an object's position, similarity between features is measured when the data used for comparison is collected as two objects traverse the same region within the field of view. To account for this dependency, the field is broken into an m×n grid, and only data collected within the same grid is used in the similarity metric. For example, m and n in a range such as 5-25 would be useful. A feature vector is created that corresponds to the grid blocks traversed by the object. FIGS. 6 and 7 show objects traversing the field of view in two different scenarios. In FIG. 7, a person's path is plotted on the image along with circles indicating the object's position when the frame was captured and, correspondingly, when feature data was sampled. Each circle denotes the object's location when samples were collected. If the grid is organized into N total blocks, the feature vector has N components with each component being the average over the corresponding block.

The method is designed to work well when the features within a particular block have a normal distribution. To estimate the object's feature value within each traversed block, the data collected are averaged. This average value corresponds to one of the N elements in the feature vector. FIG. 7 shows a frame that has been divided into 30, 16×16 pixel grid blocks, where the original size of the image was 320×240 pixels. The upper left-hand block corresponds to feature element (vector component) 1, and the lower right hand block corresponds to feature element (vector component) 300. If the object does not traverse a block, and therefore no data has been collected for that block, the corresponding feature element is equal to zero.

To produce a quantitative measure of how similar two feature vectors are, a distance metric is applied to the vectors. This can be any practical distance metric, such as the Euclidean distance, the Manhattan distance, the maximum value, the Chebychev metric, the Quadratic metric, or a non-linear metric. The first preferred embodiment methods use the modified Euclidean and Manhattan metrics to measure similarity between features. The standard Euclidean metric is $$d = \sqrt{\sum_{i=1}^{N} (f_{1(i)} - f_{2(i)})^2},$$

where $f_1$ and $f_2$ are feature vectors The standard Manhattan metric is $$d = \sum_{i=1}^{N} |f_{1(i)} - f_{2(i)}|,$$

where $f_1$ and $f_2$ are feature vectors

The feature vectors used in the experimental section below correspond to quantized regions traversed by an object. Differences between features should only be calculated when the two objects occupied the same block. The following modified similarity metrics were used.

For I≠0

$$d = \frac{1}{I}\delta_i, \text{ where } \delta i = \begin{cases} (f_{1(i)} - f_{2(i)})^2, & \text{if } f_{1(i)} \neq 0 \text{ and } f_{2(i)} \neq 0 \\ 0, & \text{if } f_{1(i)} = 0 \text{ or } f_{2(i)} = 0 \end{cases}$$

d=NULL, if I=0

For I≠0

$$d = \frac{1}{I}\delta_i, \text{ where } \delta i = \begin{cases} |f_{1(i)} - f_{2(i)}|, & \text{if } f_{1(i)} \neq 0 \text{ and } f_{2(i)} \neq 0 \\ 0, & \text{if } f_{1(i)} = 0 \text{ or } f_{2(i)} = 0 \end{cases}$$

d=NULL, if I=0 where I is the number of blocks traversed by both objects

It is necessary to divide by I when comparing the calculated similarity metric with any other similarity metric, since the non-normalized difference would generally be greater for objects whose paths intersected more often than others. Also it is necessary to omit element differences that correspond to cases where one of the objects traversed a particular block but the other object did not. Failing to account for this case causes the similarity metric to increase when objects do not cross many of the same blocks. In cases where the objects do not occupy any of the same blocks as they individually traverse the field of view, the similarity metric returns a NULL flag stating that no reasonable similarity comparison could be made.

3. Metrics for Path-independent Features

An obvious drawback to using features and similarity metrics that depend on path is that the system works no better than uniform if the objects never traverse intersecting paths. In some applications the objects are constrained to move in relatively small, enclosed spaces where the probability that objects will traverse intersecting paths, at least some of the time, is large. However, when the objects do not traverse intersecting paths, similarity is calculated using metrics designed to work for features that are expected to be invariant to the object's position relative to the camera. This type of feature is denoted as a path-independent feature. As objects traverse the field of view, path-independent features are expected to stay constant. An object's physical dimensions measured in the world coordinate space are path-independent features, since an object's dimensions are generally invariant as it traverses the field of view. An object's color is also, generally, a path-independent feature. The color of a car, for example, is not expected to change as it traverses the field of view, given the proper lighting conditions. The preferred embodiments provide similarity metrics that have been designed to work for path-independent features. Euclidean and Manhattan metrics are used for all of the path-independent features, except color. Histogram Intersection is applied to the color feature. The experimental section contains several evaluation plots showing that these similarity metrics can be used to allow a user to index an image database at a rate that is better than uniform. The results are shown for several, general path-independent features.

In cases where the objects do not occupy the same block, path-independent features are averaged over the entire set of sampled data. The equation for feature, f, is $$f = \frac{1}{N}\sum_{i=1}^{N} S_i \text{ for valid } S_i.$$

$S_i$ represents a value extracted from frame i of the video sequence, N represents the number of valid samples extracted, and f is the feature value saved in the database. $S_i$ is considered valid when it is extracted under the constraint that the object is completely within the field of view. This assures that the path-independent features are accurately measured when the object is partially occluded by the field of view edges. This averaging technique is designed for features that are expected to stay constant, regardless of where the object is in the images.

The color feature has also been designed to be path-independent by using an average color histogram corresponding to each object. The histogram is calculated and accumulated over the captured frames. If the object is not completely within the field of view or the area of the object is too small, then the histogram calculated for that frame is not accumulated with the previously-captured histograms. When the object exits, the accumulated histogram is divided by the total number of accumulated histograms. This gives an average histogram.

Given two histograms, P and M, each containing n bins, color comparisons can be measured using Euclidean and Manhattan distance metrics and also Histogram The Euclidean metric is $d(P, M) = \sqrt{\sum_{l=1}^{n}(p_1 - m_1)^2}$.

The Manhattan metric is $d(P, M) = \sum_{l=1}^{n}|p_1 - m_1|$.

Histogram intersection is $d(P, M) = \sum_{l=1}^{n}\min(p_1, m_1)$.

where p1 is the number of pixels of image P in the Ith color bin, m1 is the number of pixels of image M in the Ith color bin.

4. Combining Multiple Features

To quantitatively combine multiple features into a single metric, the individual metrics are scaled by appropriate normalization constants and summed:

$$d\tau = \frac{d1}{a1} + \frac{d2}{a2} + \frac{d3}{a3} + \ldots + \frac{dn}{an}.$$

The normalization constants can be calculated accurately given a labeled set of experimentally obtained data. Normalization constants for path-independent features are equal to the average standard deviation of these features. In practice the feature variances are calculated for several objects that traverse the field of view and then averaged to give the normalization constants. The variance associated with a given feature is $$\sigma_i^2 = \frac{1}{N}\sum_{j=1}^{N}(X_j - \mu)^2,$$

where N is the number of times the object traversed the field of view and μ is the mean feature value. Normalizing multiple features by their respective standard deviations causes each feature in the normalized space to have unit variance. In the normalized space $$\sigma_{norm}^2 = \frac{1}{N}\sum_{j=1}^{N}\left(\frac{X_j}{\sigma_i} - \frac{\mu}{\sigma_i}\right)^2 = \frac{\sigma_i^2}{\sigma_i^2} = 1.$$

The normalization constant is the average standard deviation $$a_i = \frac{1}{N}\sum_{j=1}^{N}\sigma_j$$

where P represents the number of objects in the data set.

Normalization constants for multidimensional features are analogous to normalization constants calculated for one-dimensional features. The normalization constants weight features such that the features' variance in the normalized space is equal to one. The multidimensional variance of object F corresponding to a given feature is $$\sigma^2 = \frac{1}{T}\sum_{p=1}^{T}\|F(p) - M\|^2,$$

where M is the mean value and T is the number of times that object F traversed the field of view. The weight applied to each distance is equal to the average standard deviation over each object in the data set $$a_i = \frac{1}{N}\sum_{j=1}^{N}\sigma_j.$$

5. Implementation

The preferred embodiment methods were implemented on the Texas Instruments TMS320C6701 digital signal processor. The TMS320C6701 allows for a real-time embedded solution to image indexing.

The TMS320C6701 DSP is the floating-point processor related to the TMS320C6000 platform. At a clock rate of 167 MegaHertz, this processor can perform 1 Giga-floating-point operations per second. The processor's architecture consists of 32 general-purpose registers each of 32-bit word length and eight independent functional units. The TMS320C6701 can compute two multiply-accumulates (MACs) per 1 cycle, which is 334 million MACs per second. This processor's specifications are outlined in Table 1.

TABLE 1

TMS320C6701 specification summary.

| HARDWARE FEATURES | | 'C6701 |
|---|---|---|
| Peripherals | EMIF | 1 |
| | DMA | 4-Channel |
| | Host-Port Interface (HPI) | 1 |
| | McBSPs | 2 |
| | 32-Bit Timers | 2 |
| Internal Program Memory | Size (Bytes) | 64 K |
| | Organization | 64 K Bytes Cache/ Mapped Program |

TABLE 1-continued

TMS320C6701 specification summary.

| HARDWARE FEATURES | | 'C6701 |
|---|---|---|
| Internal Data Memory | Size (Bytes) | 64 K |
| | Organization | 2 Blocks: Eight 16-Bit Banks per Block 50/50 Split |
| Frequency | MHz | 120, 150, 187 |
| Cycle Time | ns | 6 ns ('6701-167); 6.7 ns ('6701-150); 8.3 ns ('6701-120) |
| Voltage | Core (V) | 1.8 |
| | I/O (V) | 3.3 |
| PLL Options | CLKIN frequency multiplier | Bypass (x1), x4 |
| BGA Package | 35 × 35 mm | 352-pin GJC |
| Process Technology | μm | 0.18 μm (18C05) |
| Product Status | Product Preview (PP) Advance Information (AI) Production Data (PD) | PD |

The first preferred embodiment vision system consisted of the TMS320C6701 processor, Ethernet hardware, and video-capture hardware. Ethernet and video capture daughter boards were attached to the TMS320C6701 to allow for video capture and web serving on the DSP platform.

Figure 8:
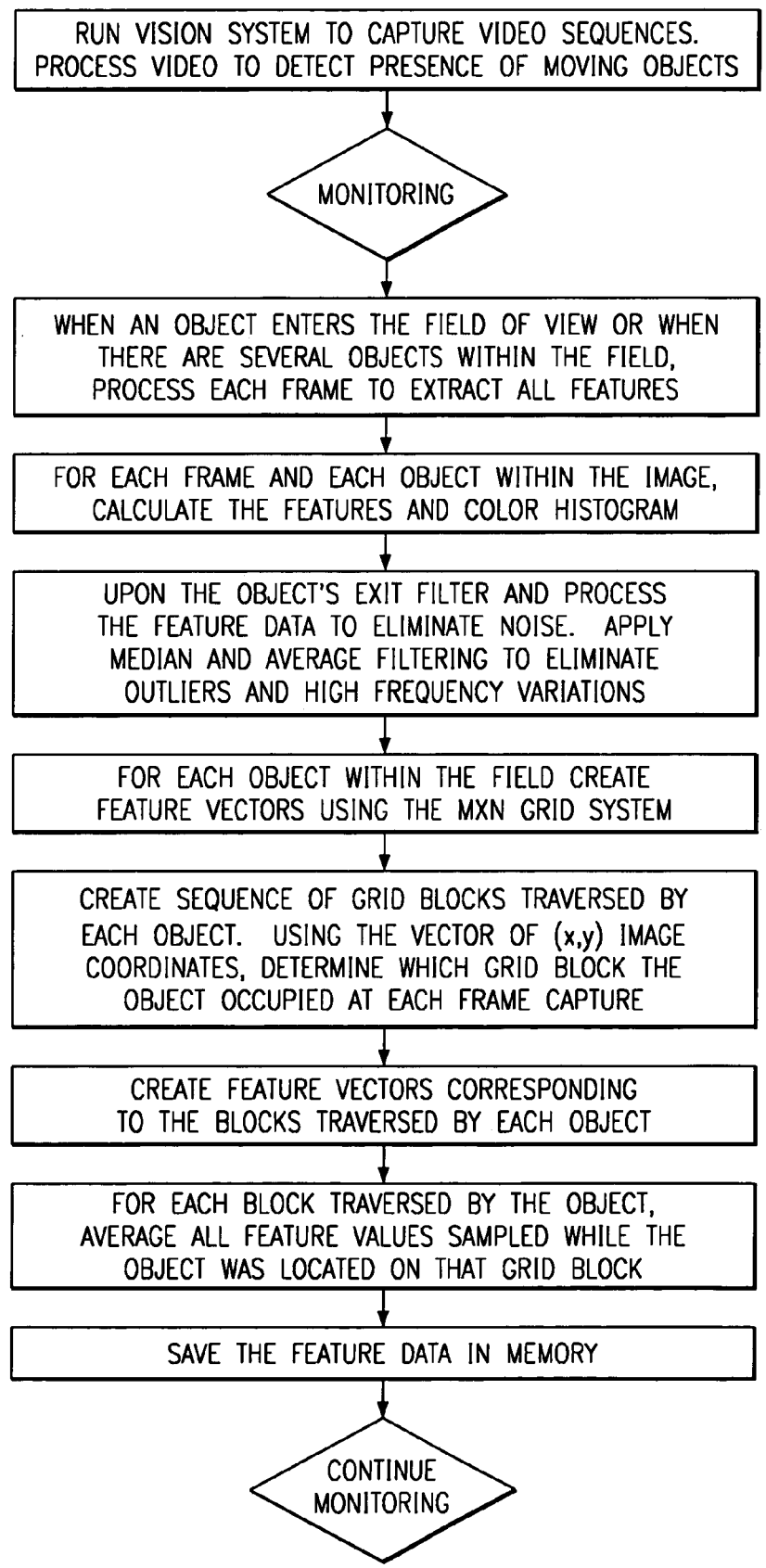
FIGS. 8-9 are flow diagrams.
Figure 9:
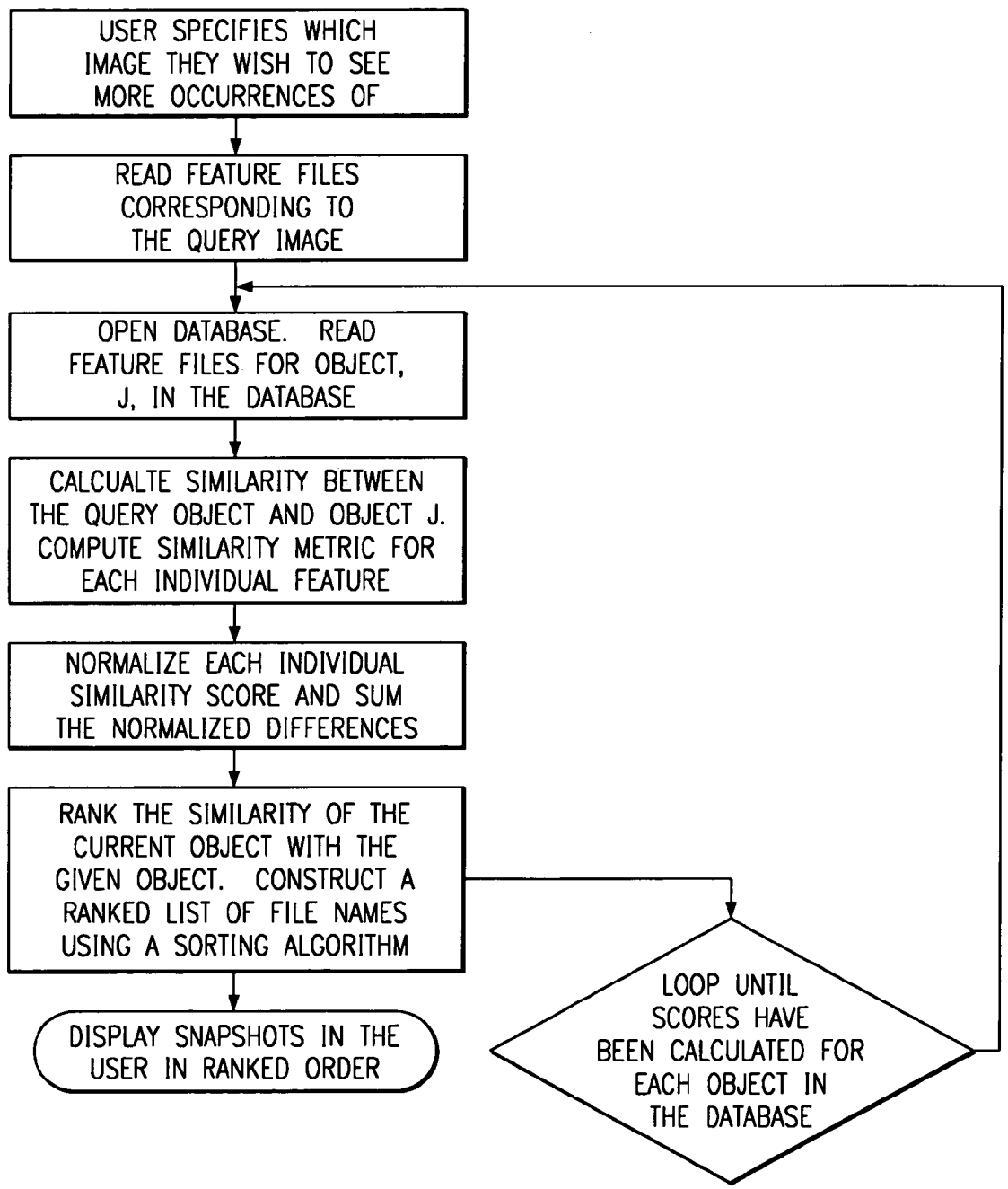

The software block diagrams shown in FIG. 8 and FIG. 9 illustrate the software steps taken to implement the system. The system can be split into two processes: feature extraction and image indexing. Feature extraction involves acquiring, processing, and saving features into memory. The sorting method involves reading feature data, computing similarity, and creating a ranked list of similar objects. The feature generation implementation is shown in FIG. 8 and described below.

Run vision system to capture video sequences. Process video to detect the presence of moving objects: Once the system is activated, it waits for objects to appear.

Monitoring: The system persists in its monitoring loop while no objects are in the field of view. In this loop the system runs a detection algorithm to determine if an object has entered the field of view.

When an object enters the field of view or when there are several objects within the field the system extracts the features for each object: Each object that enters the field of view is assigned an identification number. The object is segmented from each frame and tracked as it traverses the field of view. Real-time features are extracted to characterize each segmented object.

For each frame and each object within the image, extract the features and calculate the color histogram. Physical information that can be measured from the segmented image is extracted from the TI vision system and stored into a linked-list. The histogram is calculated using the color-space coordinates associated with each pixel in the segmented image.

Upon the object's exit, filter and process the feature data to eliminate noise. Apply median and average filtering to eliminate outliers and high frequency variations. Calculate second-order features and average values: When an object exits, the feature data, extracted as the object traversed the field of view, is processed and stored within a data structure. The abstract data type used in this implementation consisted of a C-type structure containing several arrays, linked lists, and integer variables. Some of the feature data is median-filtered to eliminate data outliers, and some is also average-filtered to eliminate random variations among the data samples. This data is maintained in arrays or linked-lists. After the data has been modified other features can be calculated from the original data collected. These are called second order features. These features are stored in arrays or linked-lists. The averages are calculated by adding each element in a feature array/linked-list and dividing by the number of elements in the linked list (see the foregoing section on metrics for path-independent features). Recall that these features cannot depend on the object's position within the field of view.

For each object within the field create feature vectors using the m×n grid: For features that do depend on the object's position from the camera create feature vectors corresponding to the object's position in the m×n grid (see foregoing section on metrics for path-dependent features).

Create sequence of grid blocks traversed by each object. Using the vector of (x,y) image coordinates, determine which grid block the object occupied at each frame capture: This step maps (x,y) image coordinates to m×n grid blocks. The grid block sequence is stored in a list.

Create feature vectors corresponding to the blocks traversed by each object: Using the grid block list all feature values collected while the object occupied a given block are stored together.

For each block traversed by the object, average all feature values sampled while the object was located in that grid block: In this final step the average feature vectors are created by averaging all values collected in each bin.

Save the feature data in memory: Write the average feature values and the average features vectors to files. The files will be accessed by the image sorting algorithms. The file names are given the time-stamp values associated with the first captured image of the object.

Continue Monitoring: The program returns to its monitoring state after recording the latest feature data.

Image indexing, the second stage of software implementation, allows a user to query the database to find similar objects. Users interact with a Java graphical user interface to specify an object of interest. The image indexing method returns a ranked list of similar objects to the user, which the user can view sequentially. The method illustrated in FIG. 9 is described below.

User specifies which image they wish to see more occurrences of: The user can sequentially view entries in the image database through the graphical user interface. When the user finds an object of interest, the user clicks on the image name and launches the sorting algorithms.

Read feature files corresponding to the query image: The query image is an image of the object the user wishes to see more occurrences of. The feature files created during the feature extraction stage, as this object traversed the field of view, are read. Once read the data is stored into a C-type structure for easy comparison to each object in the database.

Loop until scores have been calculated for each object in the database: A loop is established to compare the feature data between the object of interest and each object in the database.

Open database. Read feature files for object, i, in the database: The first command in the loop is to read the data files corresponding to element, i, in the database. The data is read and stored into a C-type structure.

Calculate similarity between the query object and object i. Compute similarity metric for each individual feature: Using the similarity metrics defined in the foregoing, compute similarity metrics for each feature.

Normalize each individual similarity score and sum the normalized differences: Normalize each similarity measure and add the normalized measures.

Rank the similarity of the current object with the given object. Construct a ranked list of file names using a sorting algorithm: The ranked list can be computed efficiently by inserting each score and file name into a linked-list.

Display snapshots to the user in ranked order: The ranked list is written to a file and read by a Java applet that displays the list. When the user clicks on a name in the list, that image file is displayed to the user.

6. Evaluation of the Image Indexing Method

Evaluating the preferred embodiment image indexing method tests the ability of the similarity metrics to improve the efficiency of retrieving images of similar objects when using the TI vision system and a set of features. Two experiments were performed to collect data for the evaluation process. Experiment #1 involved monitoring an office hallway with the TI vision system. The system recorded features for several people that repeatedly traversed the hallway. For experiment #2 the vision system was installed to monitor a low-traffic roadway. Several cars repeatedly traversed the field of view as the vision system collected features in real-time. The similarity metrics were evaluated using eight features, and the results are presented in the following.

The evaluations in this section show the following results.

Given a set of path-independent and path-dependent features, the image indexing system can discriminate different objects.

Averaging path-independent features over the entire set of valid data can form compact clouds corresponding to individual objects.

Combining properly normalized path-independent features can improve the performance of the image indexing method.

Combining properly normalized path-independent features can improve the performance of the image indexing method.

Efficiency of the system is better than uniform for a set path-dependent and path-independent features.

The Efficiency is a measure of how many images a user must view to observe images of interest to that user. The Efficiency is defined and summarized for several feature combinations below.

The features include a set of path-independent and path-dependent features. The features are referred to as Feature1, Feature2, Feature3, Feature4, Feature5, Feature6, Feature7, and Feature8. Feature1 through Feature4 and Feature8 are path-independent features. Feature5 through Feature7 are features that depend on the object's position relative to the camera. The features definitions are listed in table 2.

TABLE 2

FEATURE 1 through FEATURE8 are defined in this table. The indexing system uses two types of features, path independent features and path dependent features.

| Path Independent Features | | Path Dependent Features | |
|---|---|---|---|
| FEATURE1 | World Height | FEATURE5 | Size |
| FEATURE2 | World Width | FEATURE6 | Image Height |
| FEATURE3 | World Velocity | FEATURE7 | Image Width |
| FEATURE4 | World Aspect Ratio | | |
| FEATURE8 | Color | | |

Objects are automatically segmented from each frame and the features are calculated to characterize the object. World height is the object's height in world coordinates. World width is the object's width in world coordinates. World velocity is equal to the object's average traversal velocity through the field of view. The object's size is equal to the total number of pixels occupied by the object within the field of view. Image height is the object's height in image coordinates. Image width is the object's width in image coordinates. The color feature is the color histogram of the segmented object.

Figure 10:
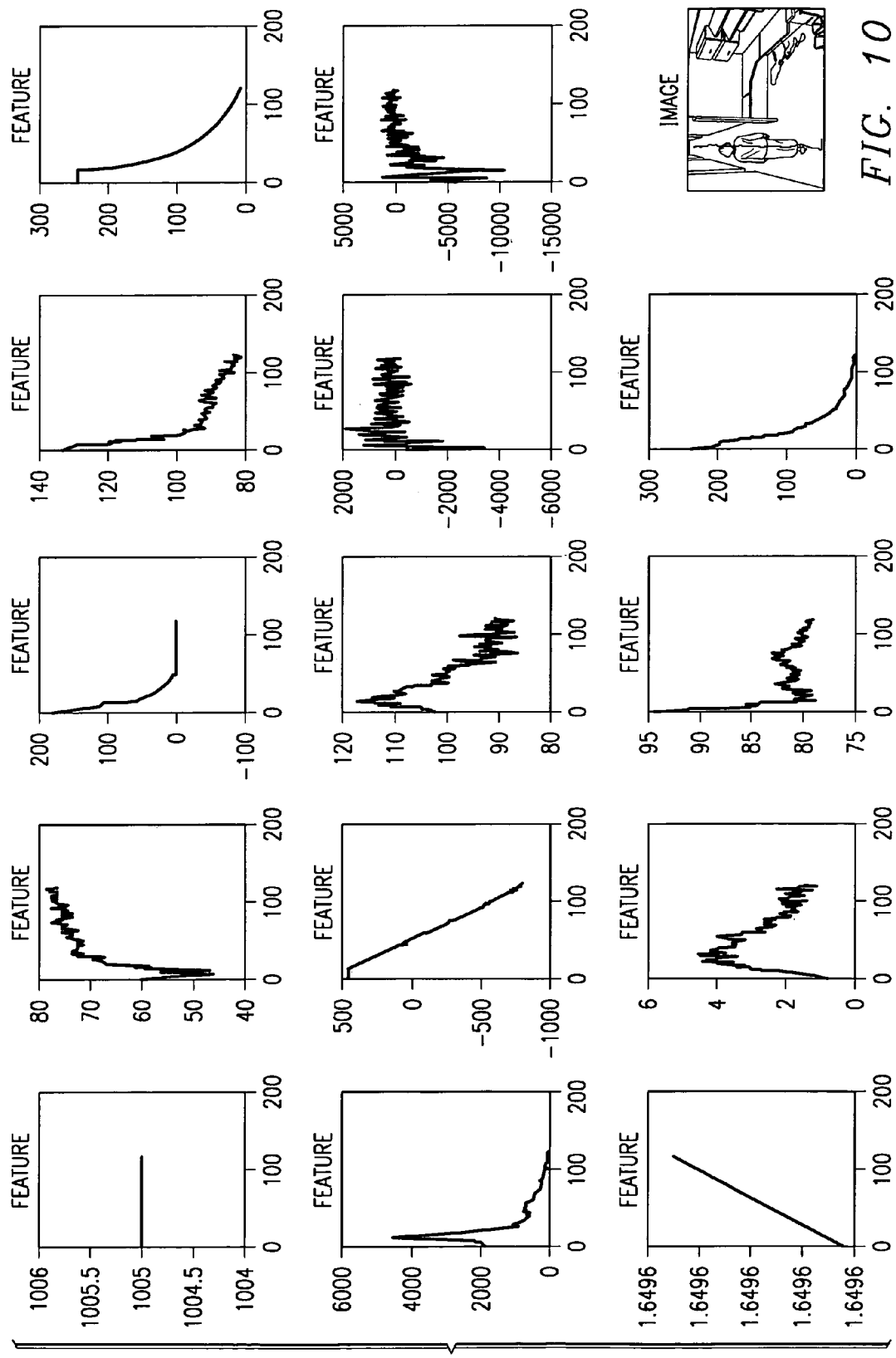
FIGS. 10-14 illustrate features versus position.

As described in the foregoing, path-independent features denote any numerical characteristics that are expected to be invariant as the object traverses the field. Path-dependent features are expected to vary. An object's physical dimensions in world coordinates are path-independent features, and an object's physical dimensions in image coordinates are path-dependent features. To determine which similarity metrics to apply to features, simulations were performed to classify the features as path-dependent and path-independent features. FIG. 10 shows several features plotted as a function of an individual's position relative to the camera. Some of the curves vary as the object moves from position 0 to position 200. Other curves are relatively invariant to the object's position. In some cases path-independent features are invariant over a subset of the position coordinates. The path-independent similarity metrics should only be applied over the invariant regions.

Figure 11:
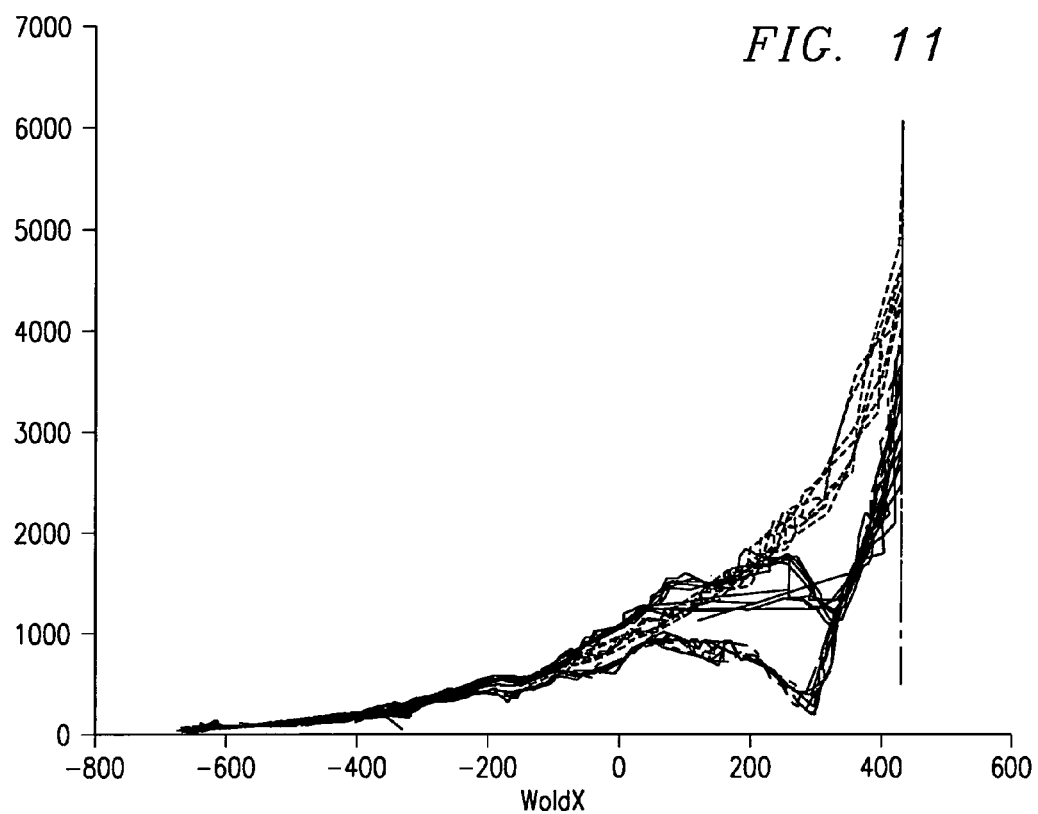

The following plots illustrate results obtained from an experiment to characterize the data. FIG. 11 shows Feature5 verses position from the camera for three individuals that walked toward and away from the camera several times. Feature5 is a path dependent feature. This feature changes with the object's position from the camera. Physical dimensions in world coordinates often have this property. As each object moves away from the camera Feature5 decreases and there is very little variation in the sampled data. As the objects get very close to the camera, Feature5 increases rapidly and the distinguishing variations of the feature disappear. Between world position 0 and world position 400, however, there is enough consistent difference between values obtained for the three individuals to hypothesize that discrimination is possible.

Figure 12:
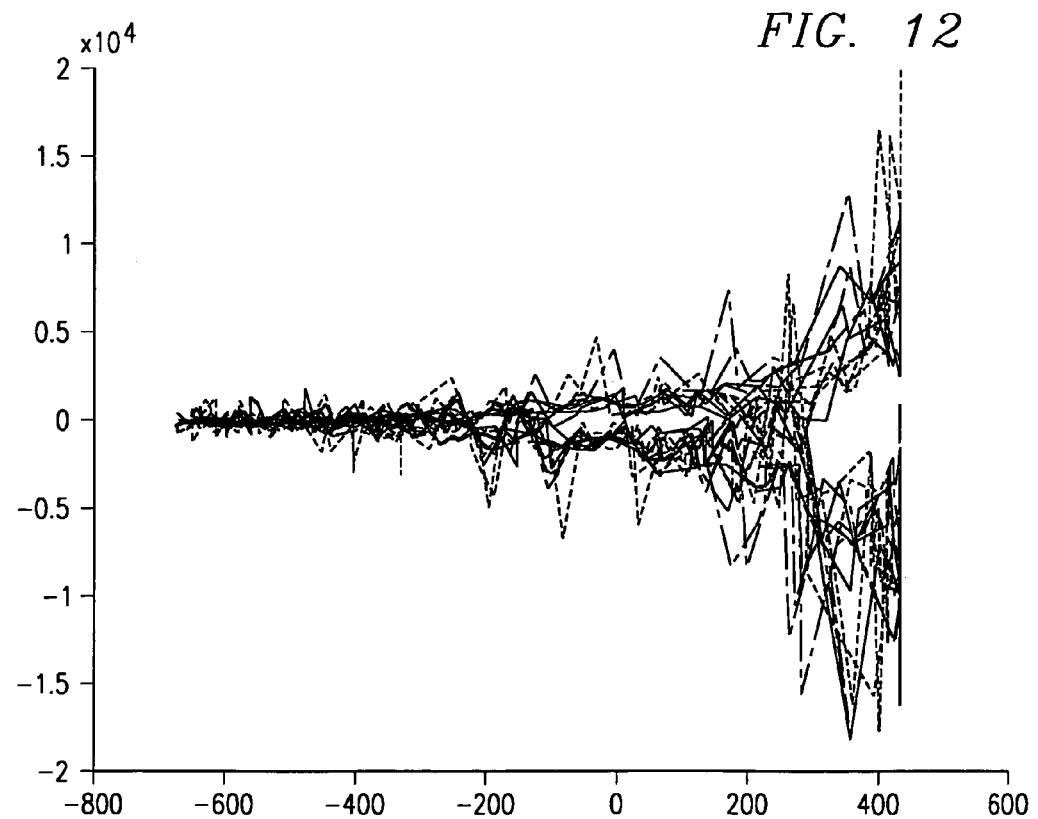

FIG. 12 shows another feature as a function of position from the camera for three individuals. Each individual walked toward and away from the camera several times. The plot shows that this feature is not consistently and significantly different to allow for a high probability of discrimination among the three individuals.

Figure 13:
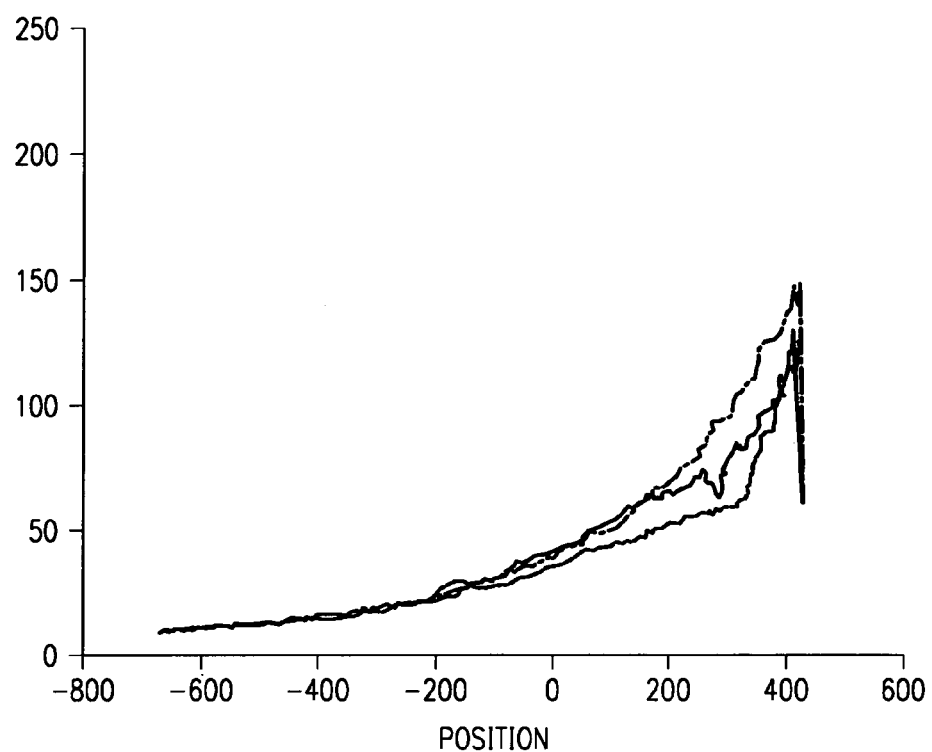
Figure 14:
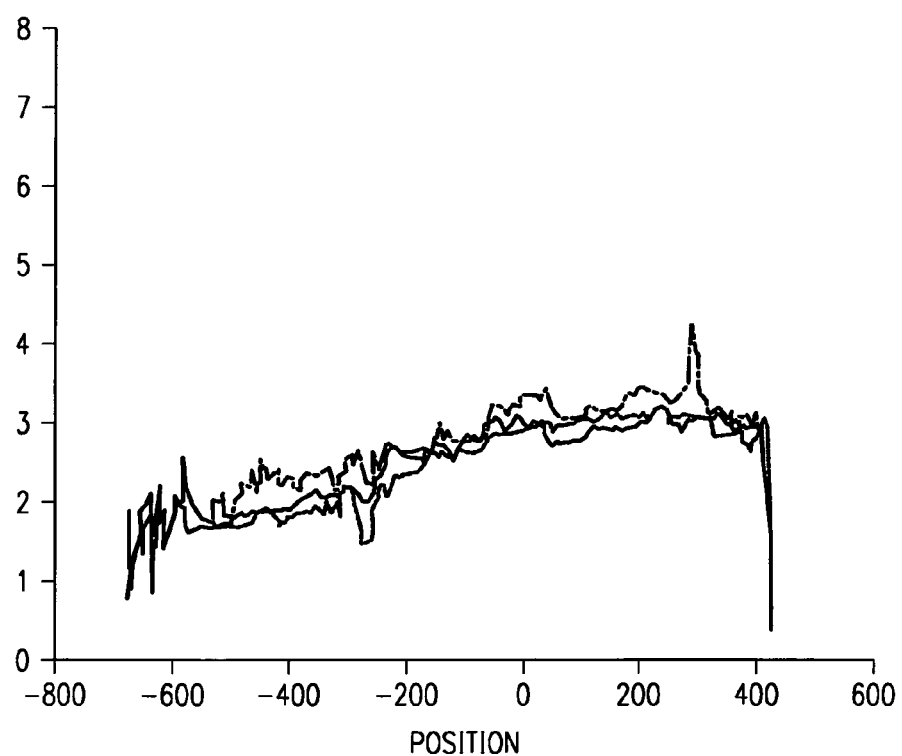
Figure 15:
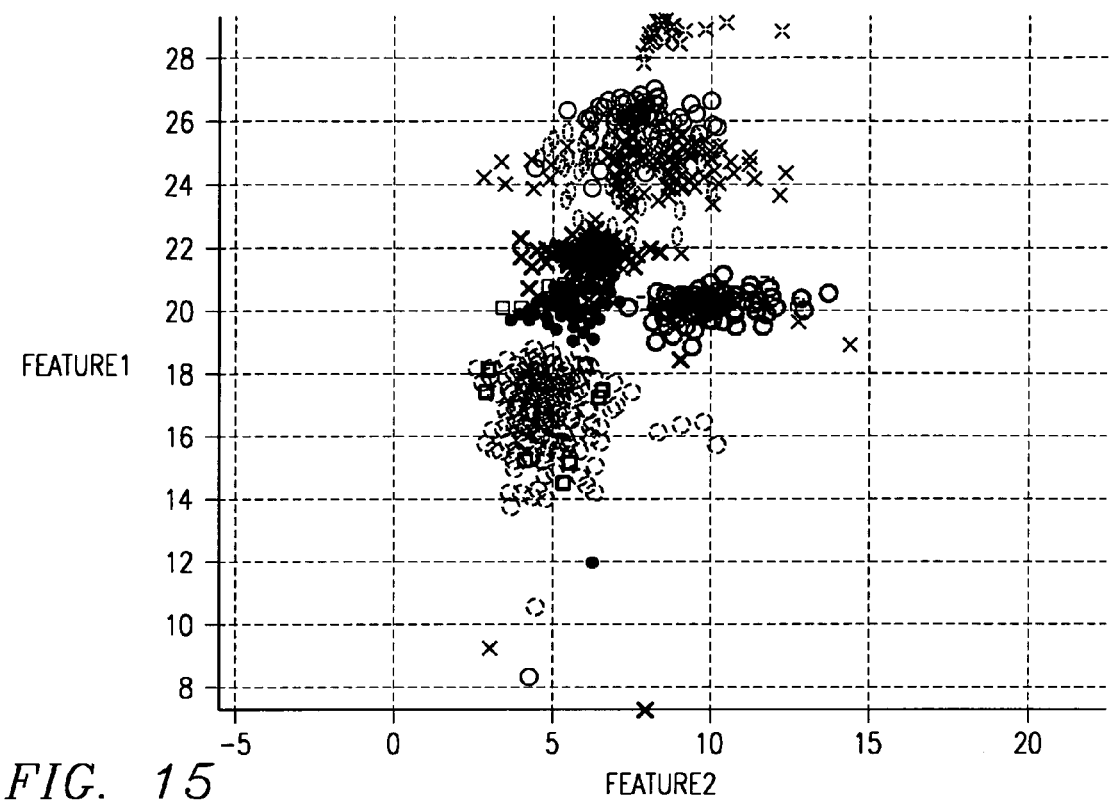
FIGS. 15-25 show feature clusters.

To increase the distinguishing power of the features, some of the features were median and average filtered to reduce outliers and high frequency noise. Examples of the processed signals are shown in FIGS. 13 and 14. A median filter was applied to each feature followed by an average filter. The yellow lines, superimposed on each signal, indicate the signal before processing.

Figure 16:
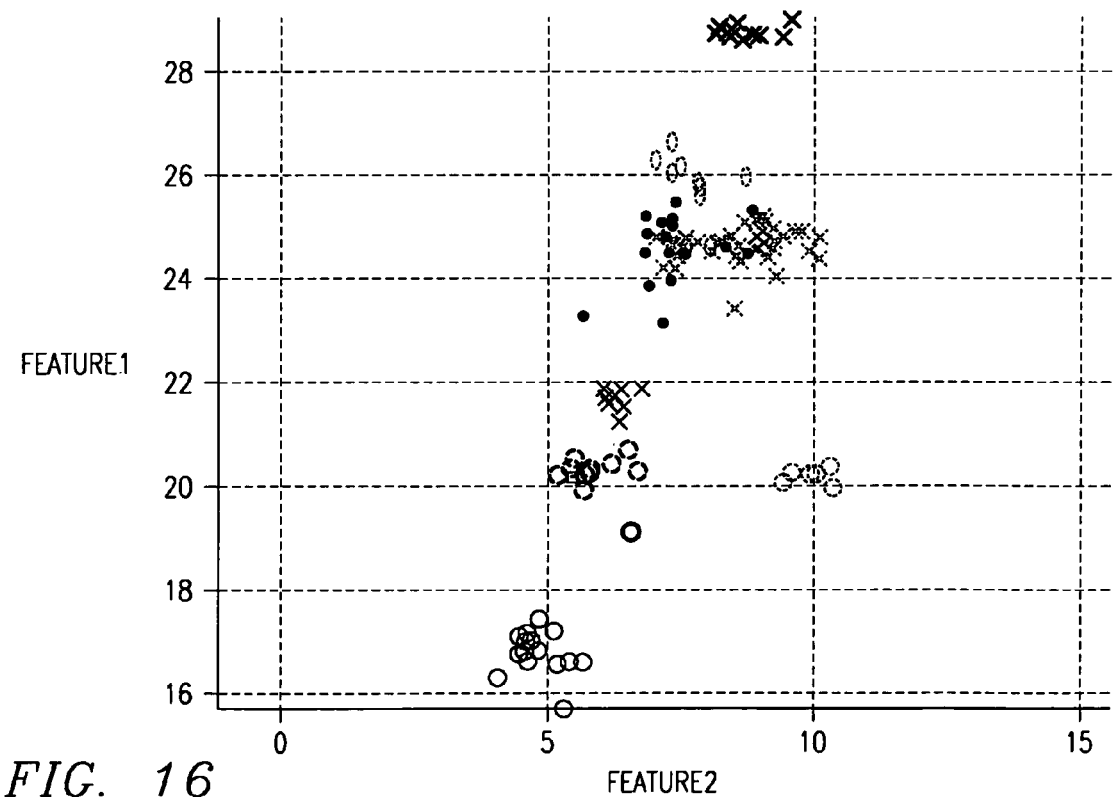
Figure 17:
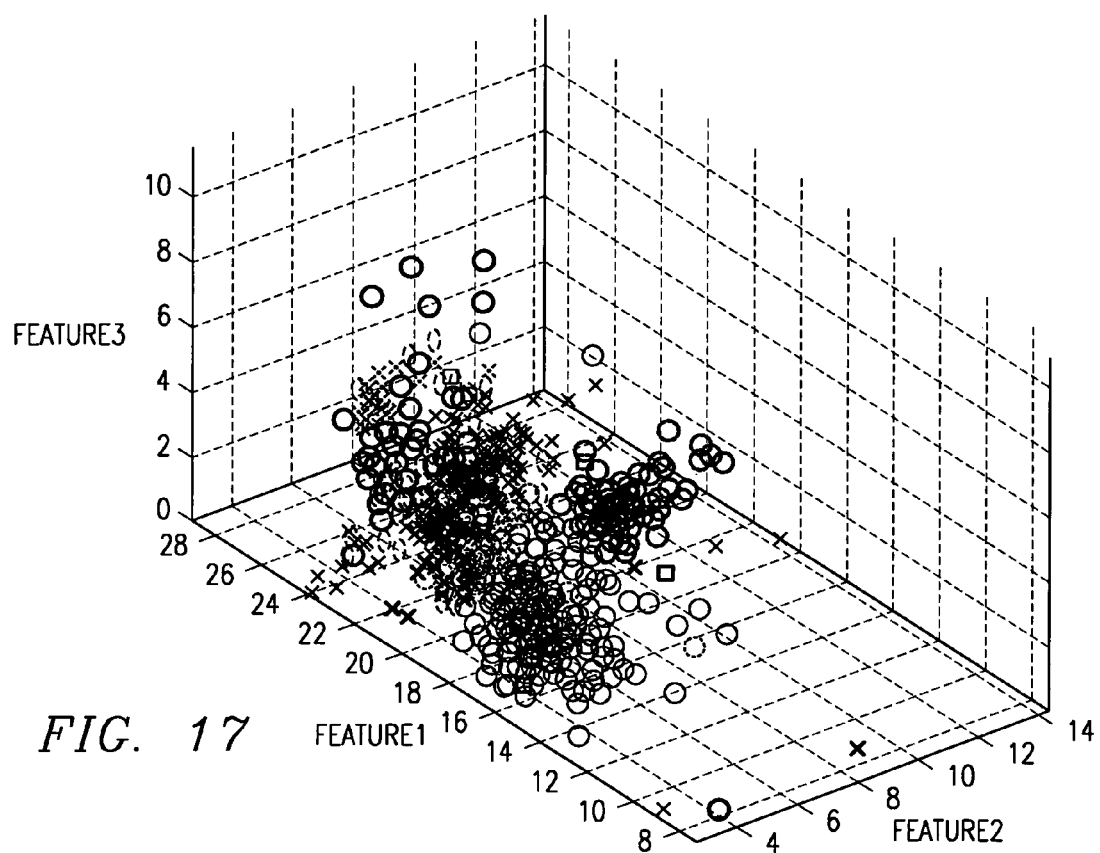
Figure 18:
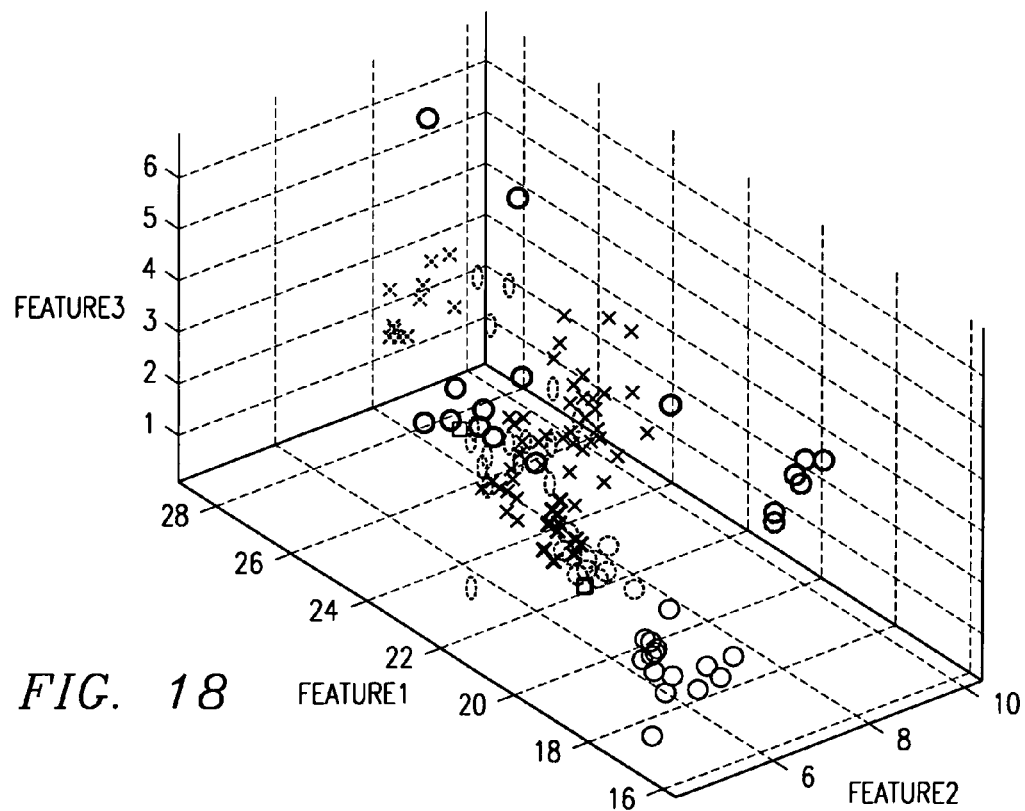
Figure 19:
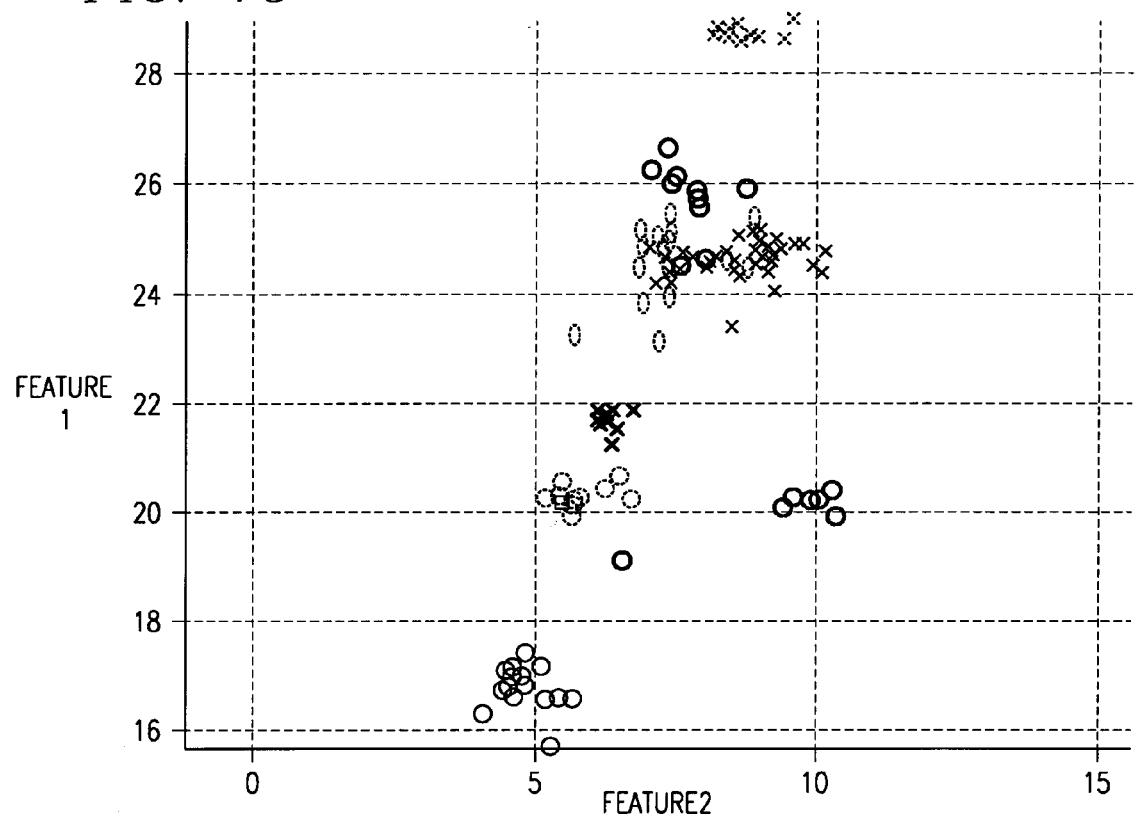
Figure 20:
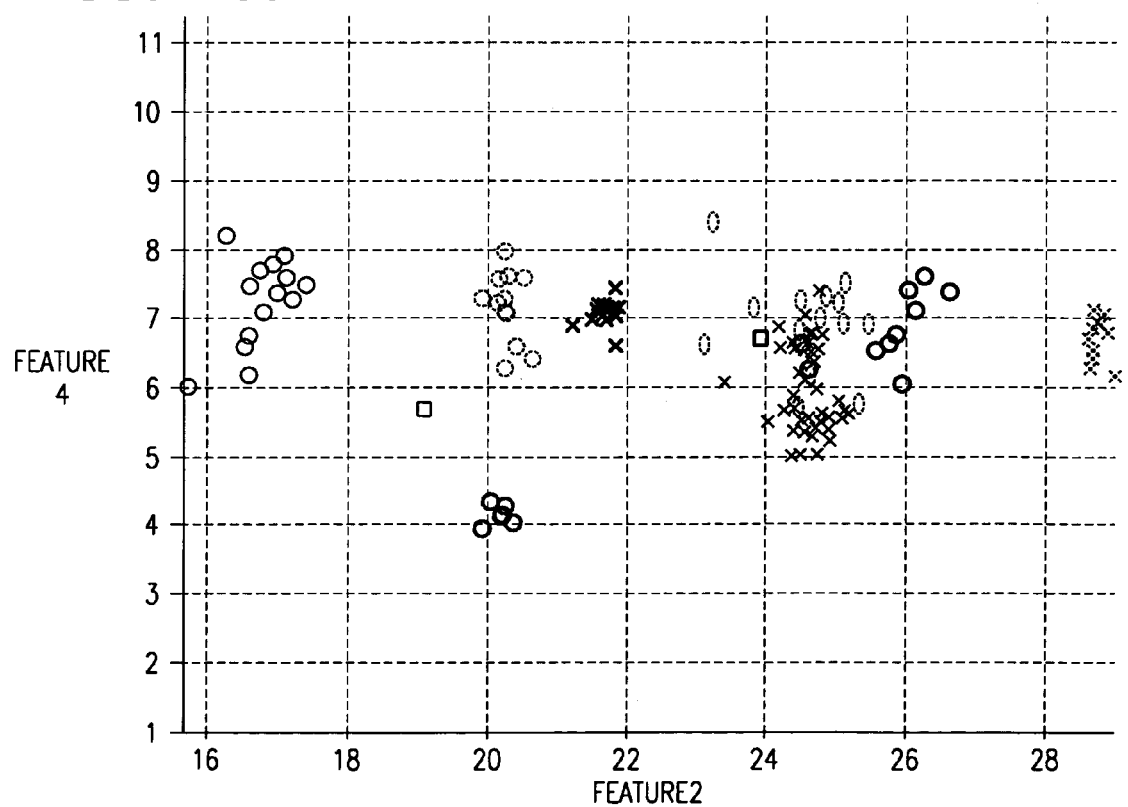
Figure 21:
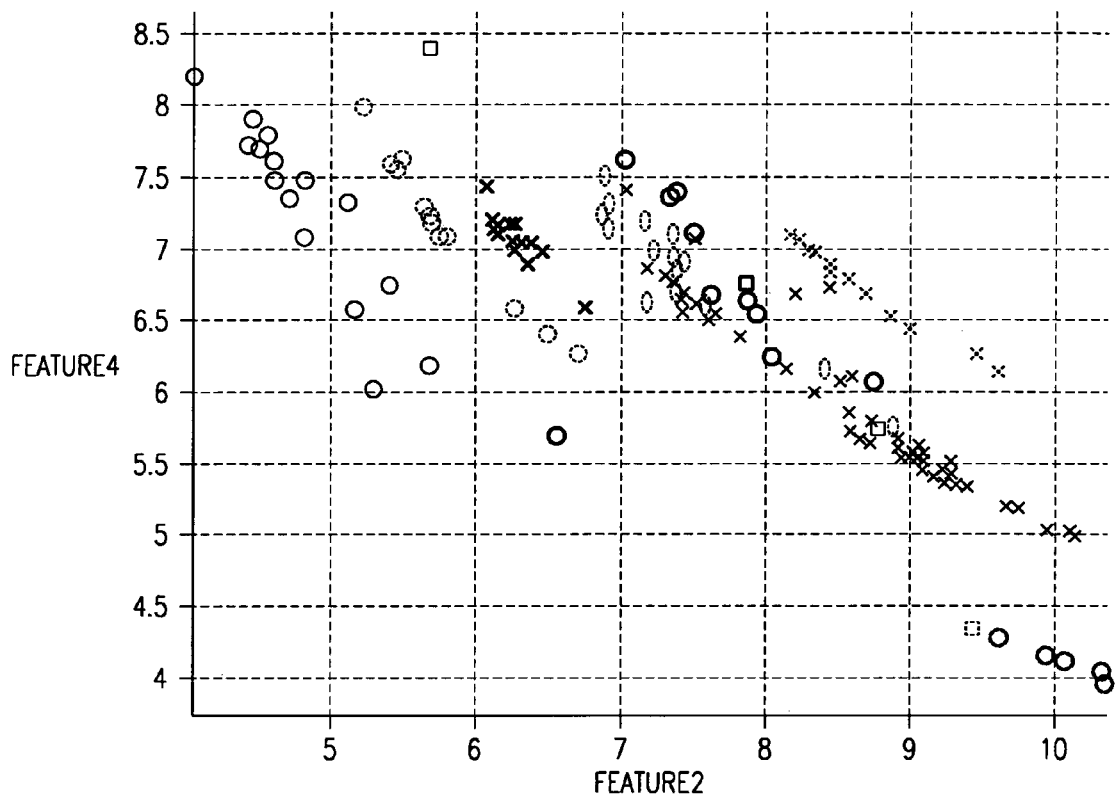
Figure 22:
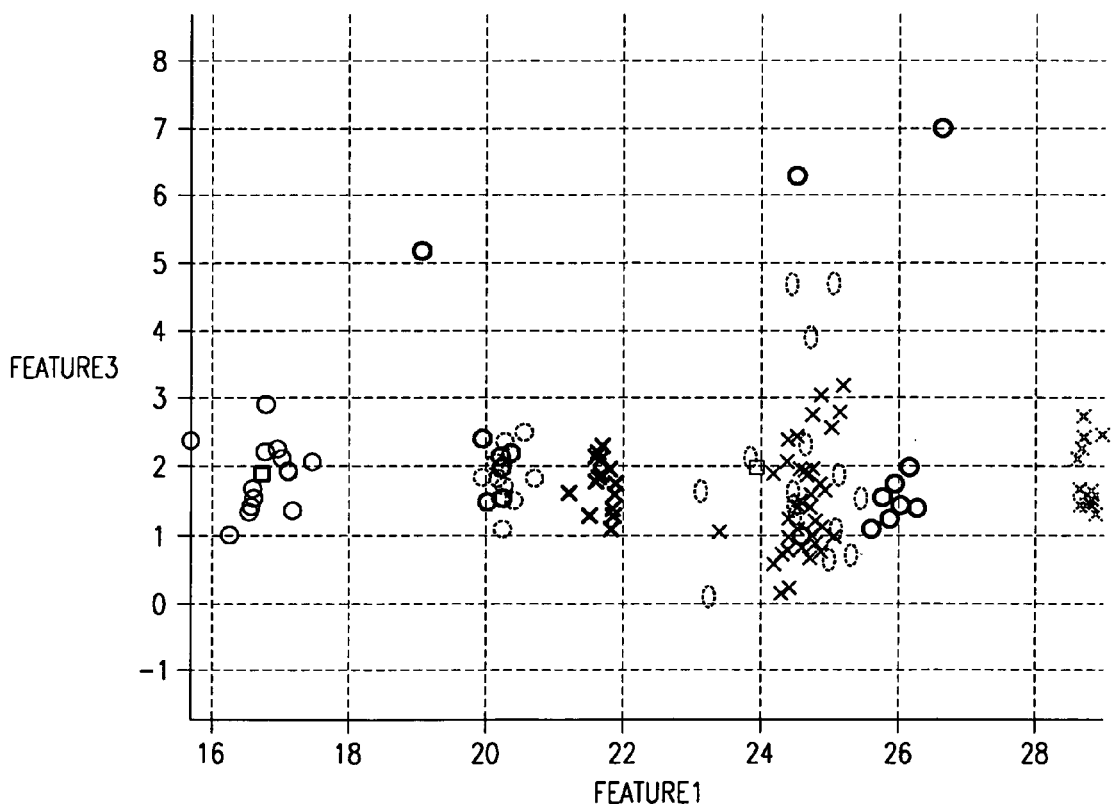
Figure 23:
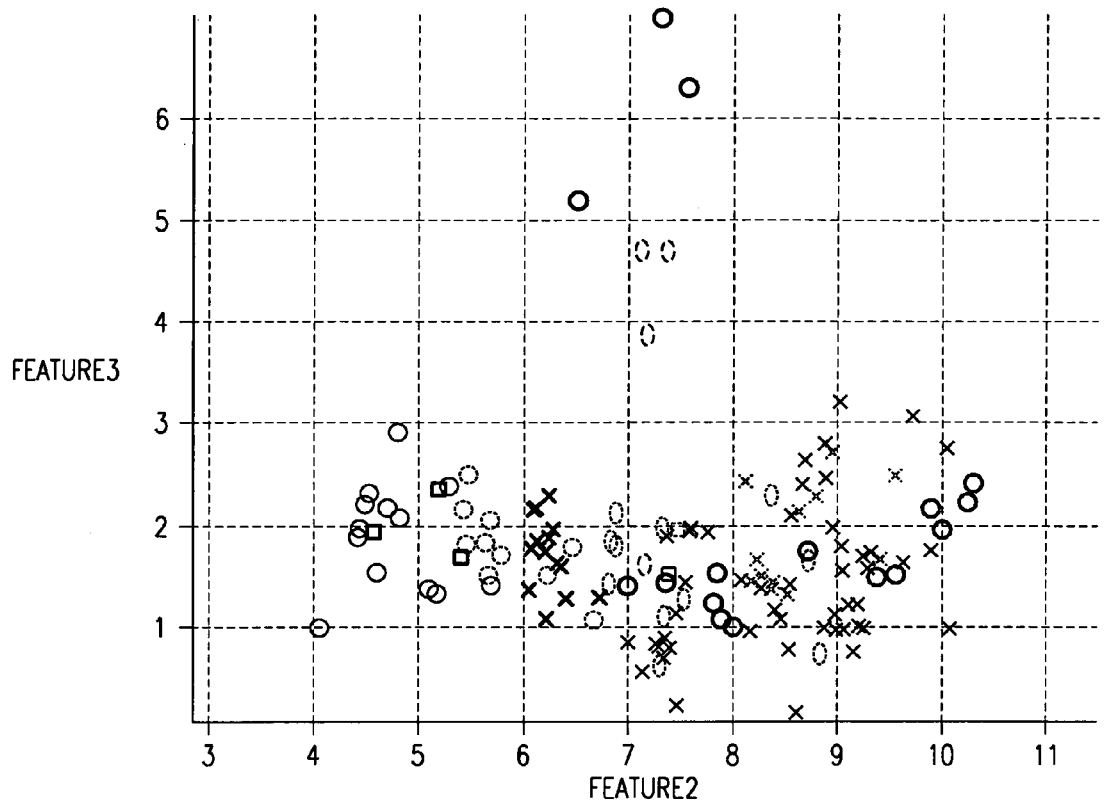
Figure 24:
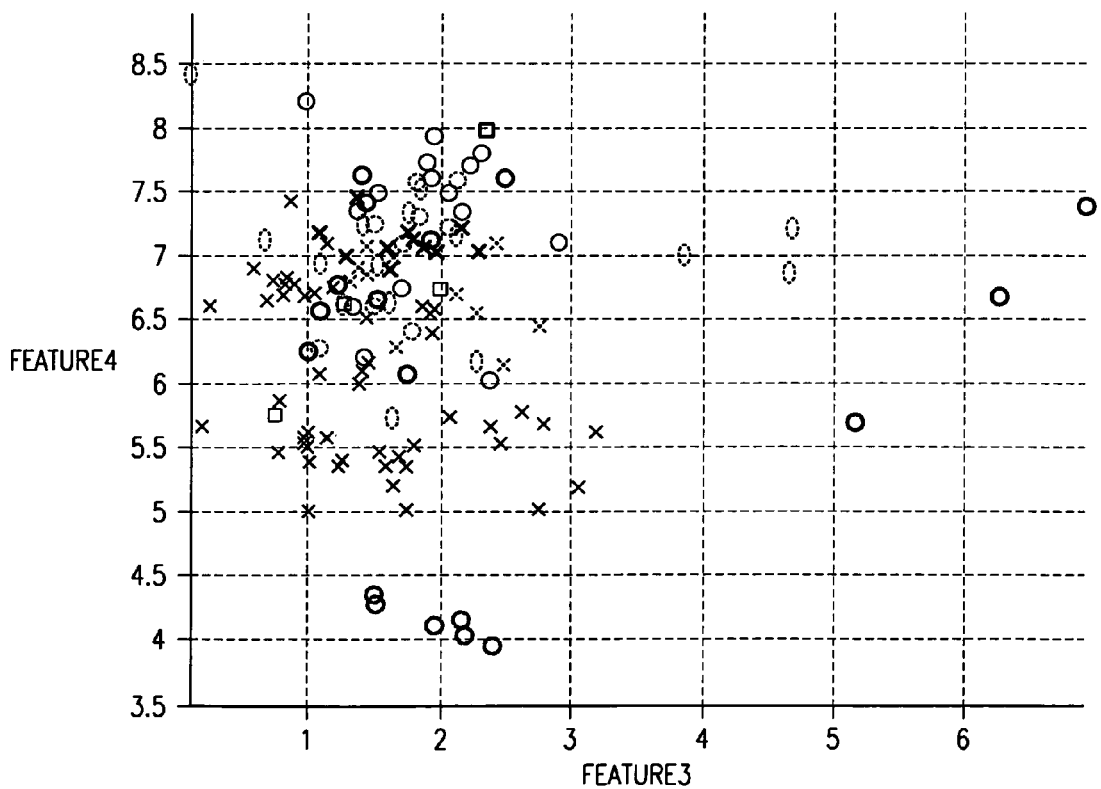
Figure 25:
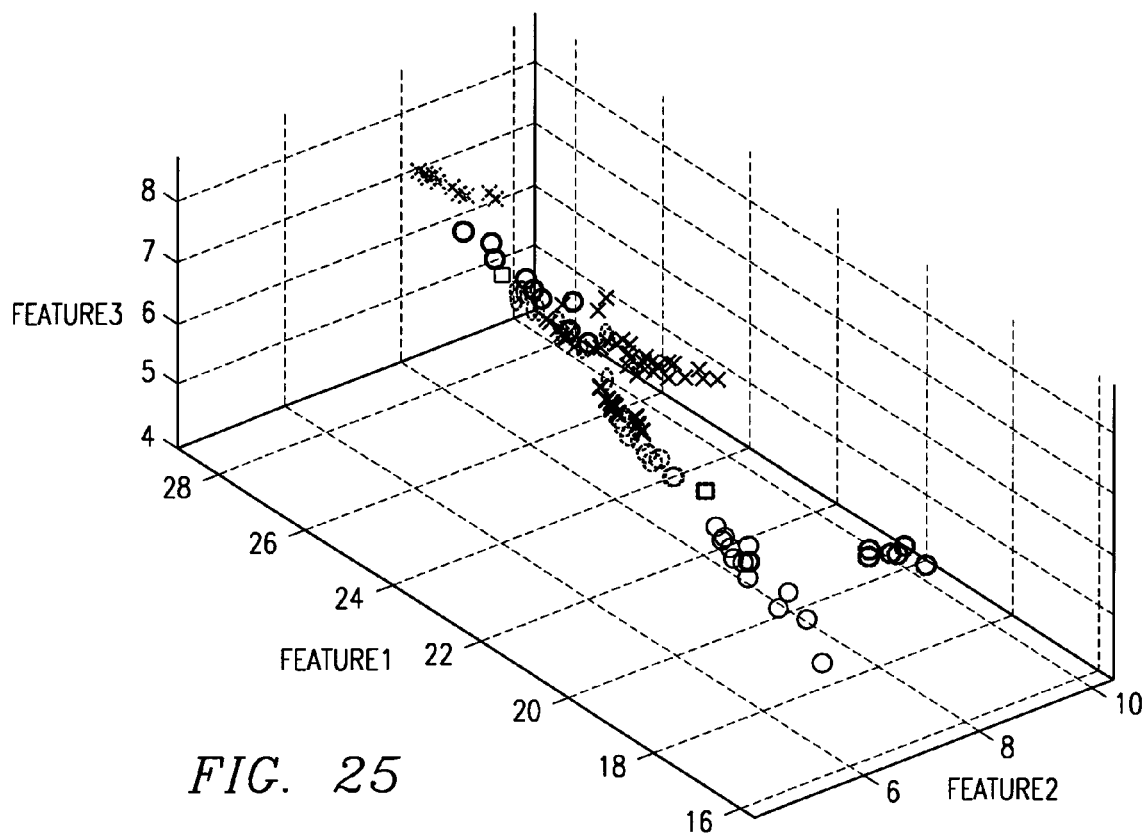
Figure 26:
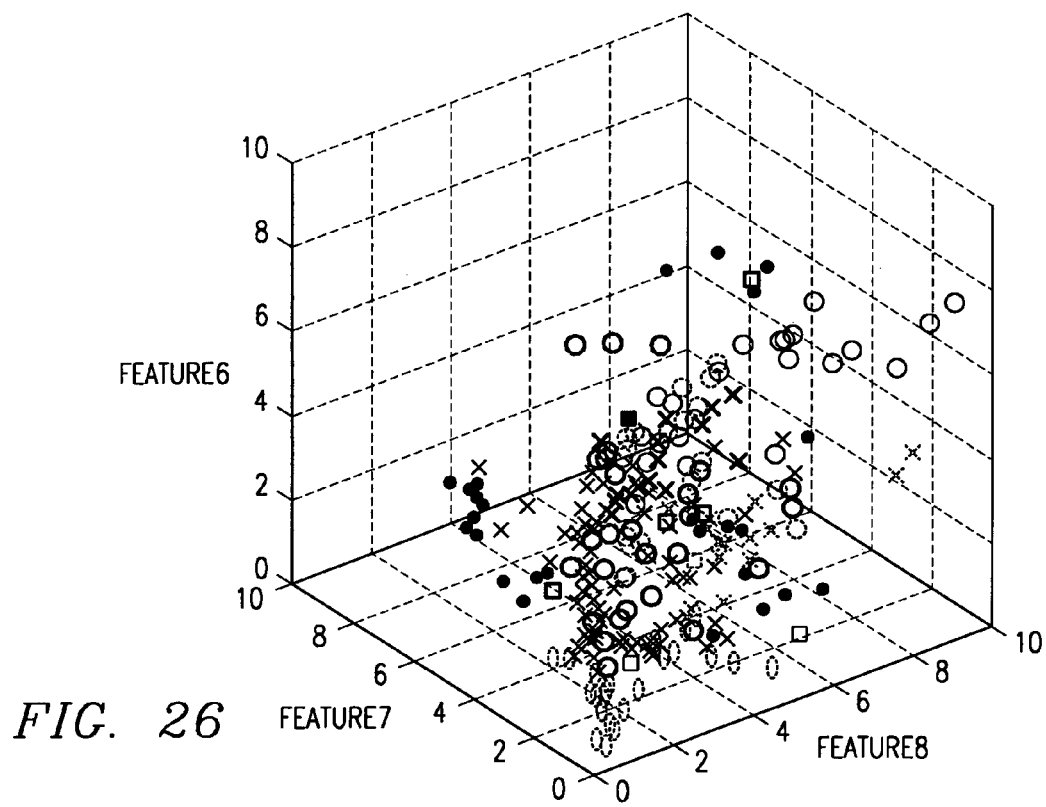
Figure 27:
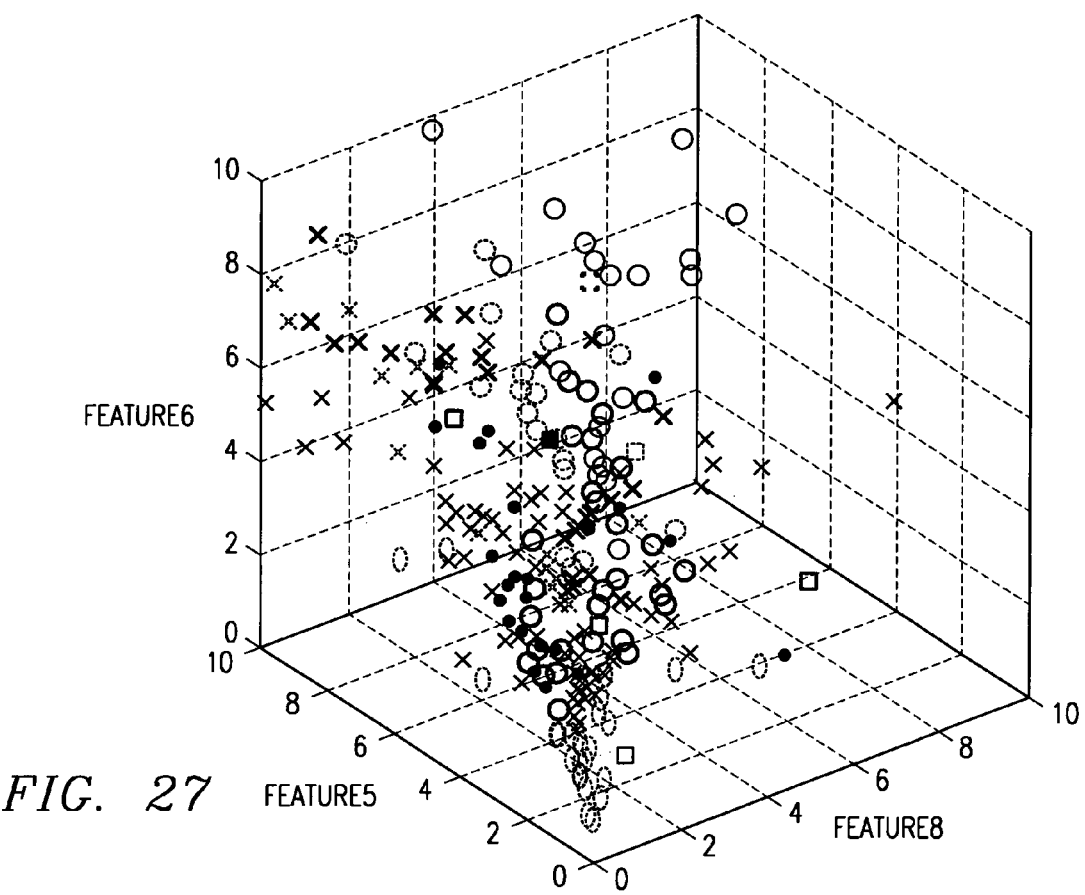
Figure 28:
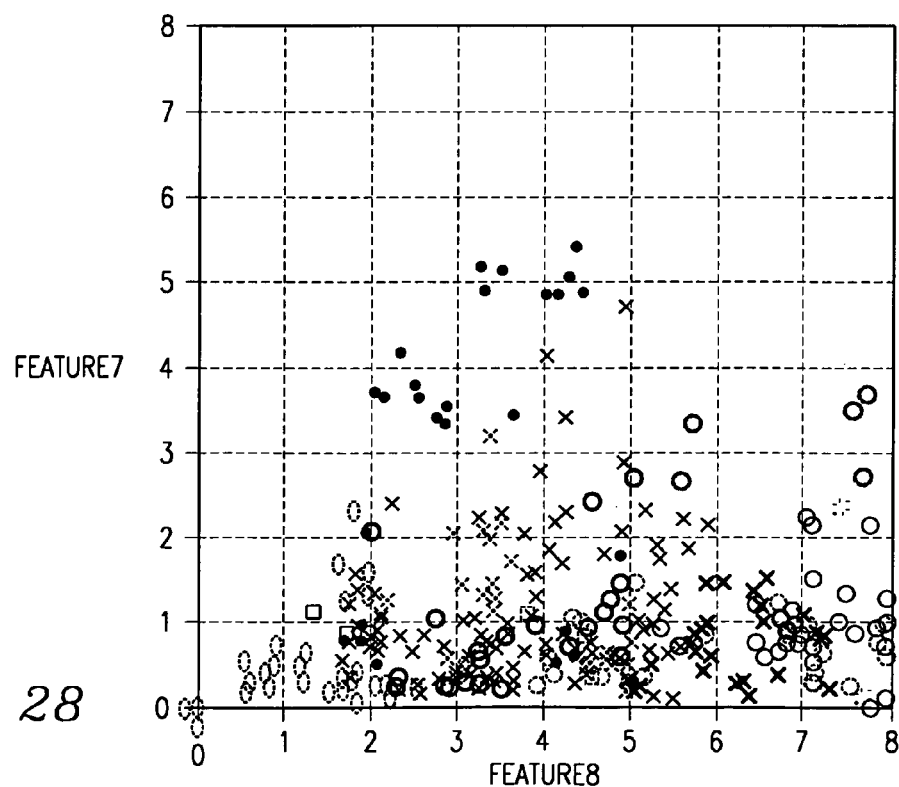
Figure 29:
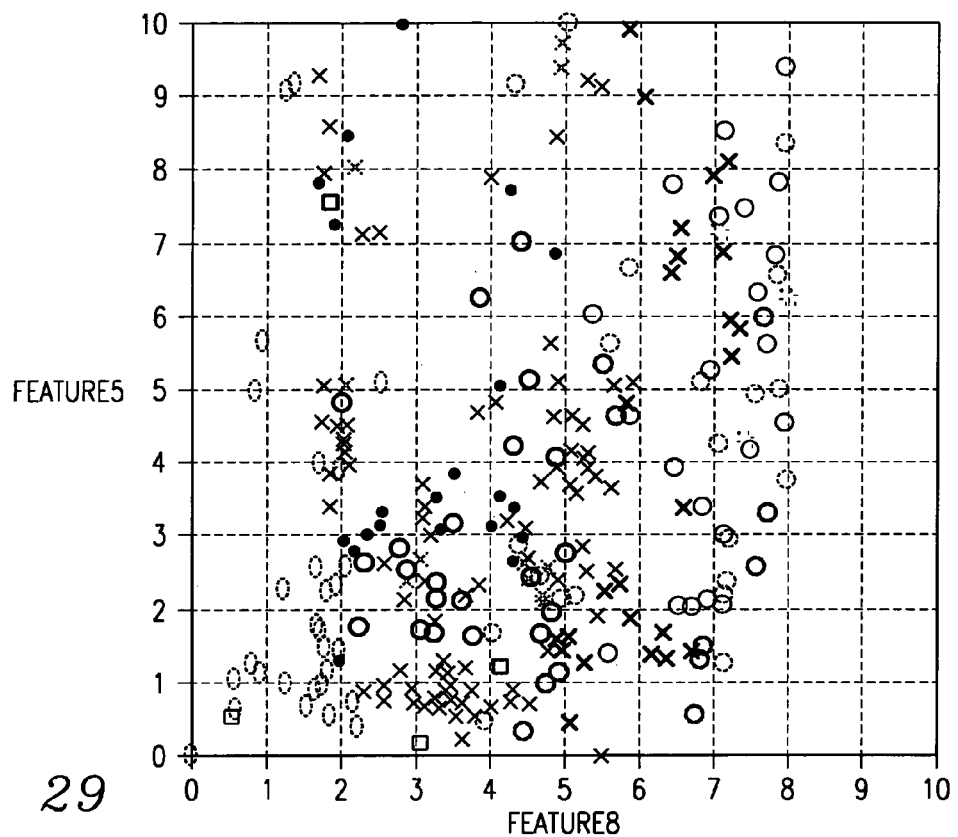
Figure 30:
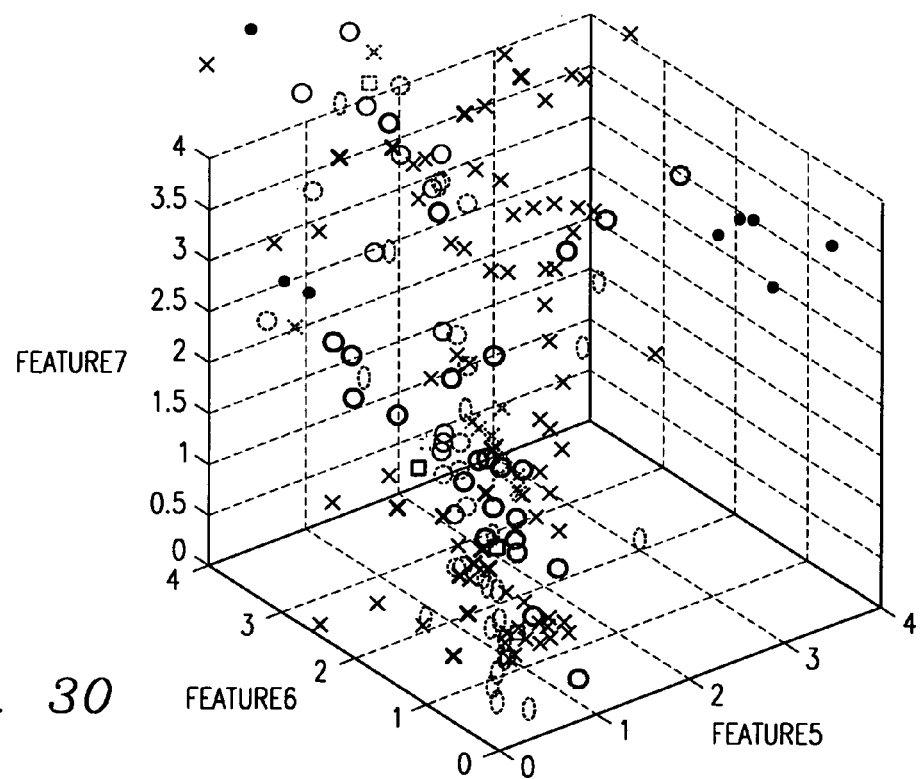
Figure 33:
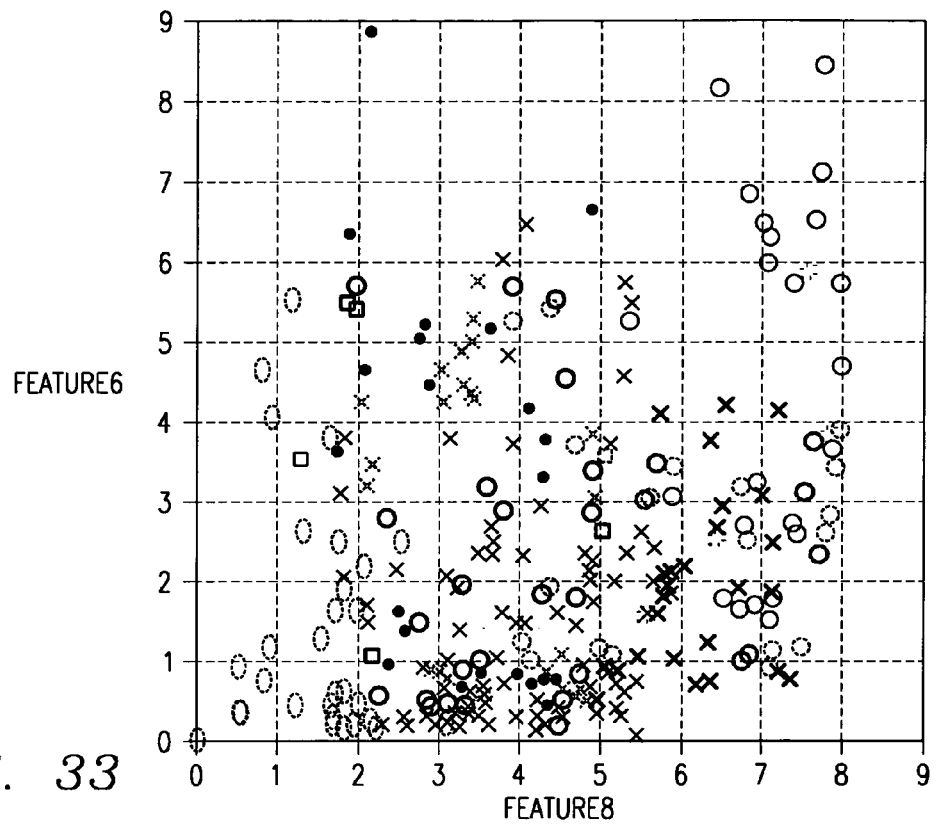
Figure 34:
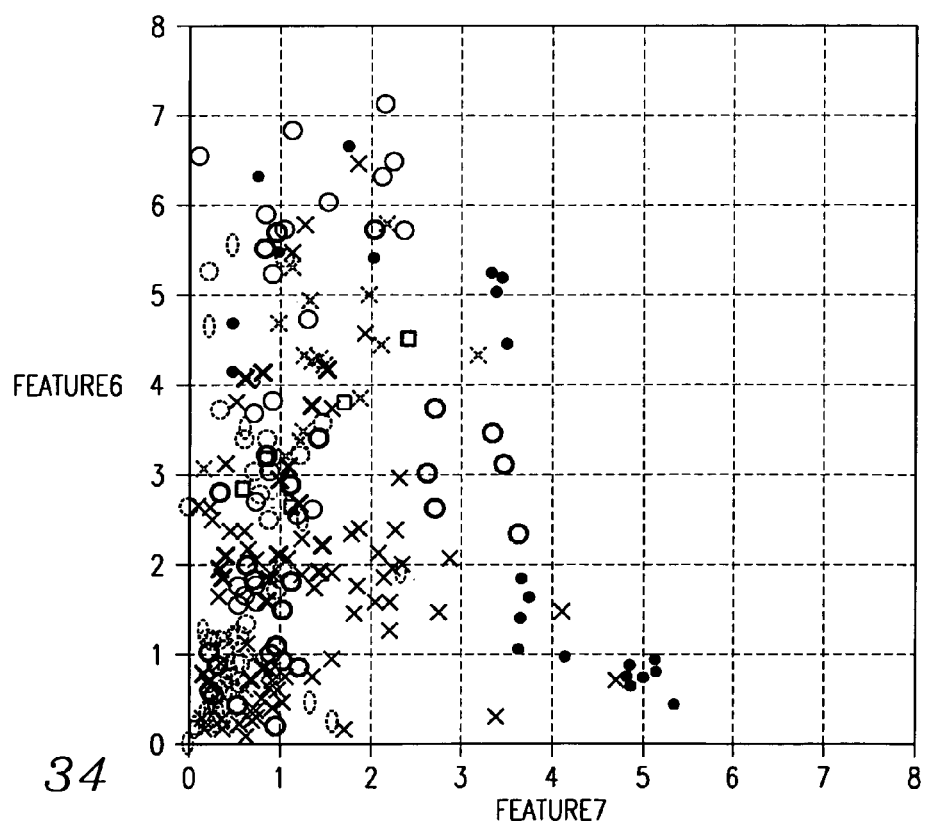
Figure 35:
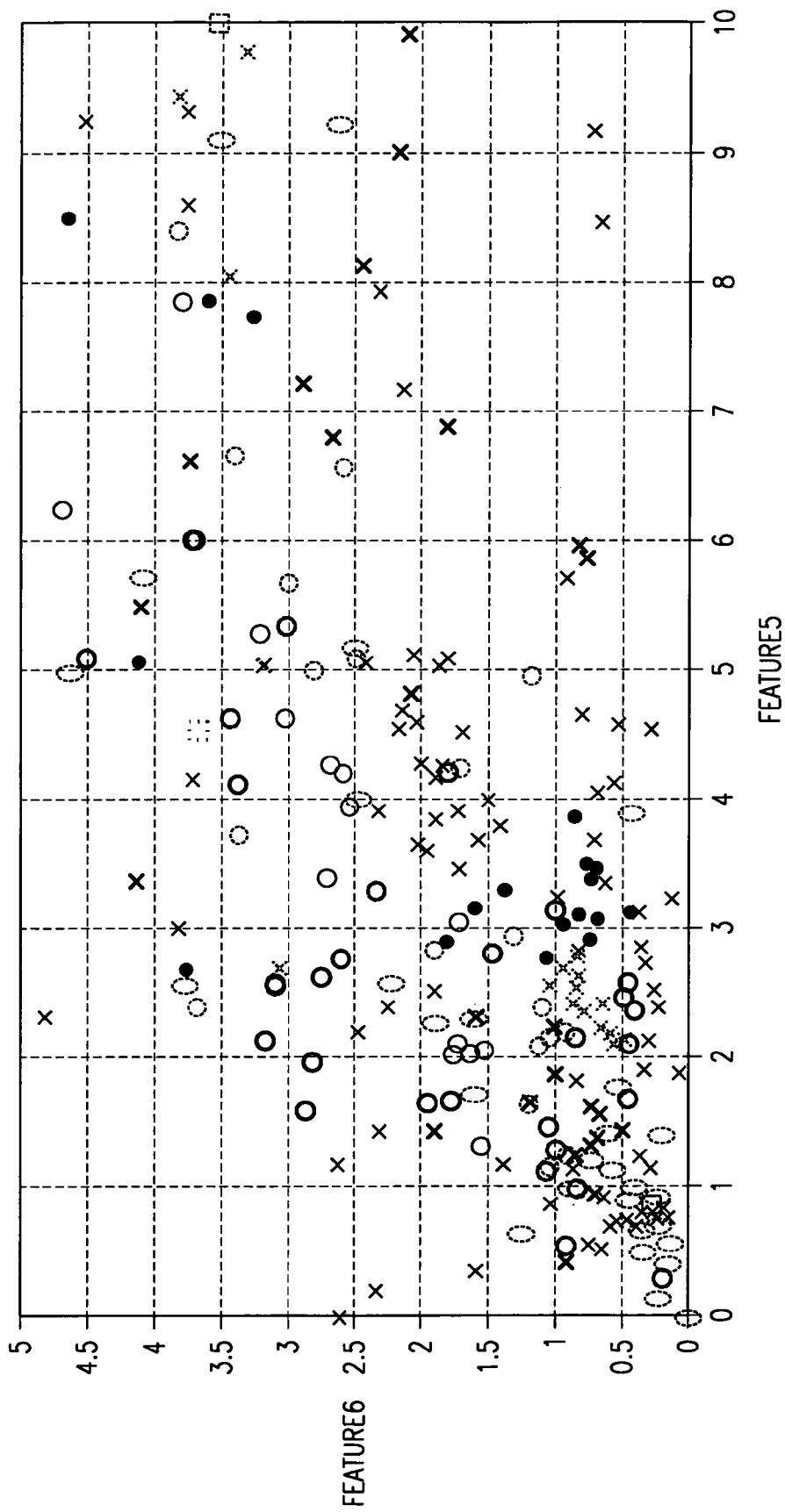

FIGS. 15 through 18 illustrate the effect of averaging path-independent features over the entire set of valid data samples. Averaging over the entire set of valid data samples was used to obtain feature values for path-independent features. All valid values are plotted for eight objects that traversed the field of view. Each object traversed the field several times. The average number of traversals per object was 10. Every valid sample has been plotted in FIG. 15 and FIG. 17. In FIG. 16 and FIG. 18, the valid samples corresponding to each traversal have been averaged, and the large overlapping clouds have been reduced to more compact clouds.

Properly normalizing features causes the measured distances in each dimension to be equally significant. The properly normalized data in the following figures has separated the data into eight distinct clusters that correspond to the eight distinct objects that traversed the field of view. Table 3 shows the mean and standard deviation for several objects and several generic features. The features are labeled Features1, Features2, Feature3, and Feature4, and each object traversed the field of view about 10 times. The data was collected to determine the normalization constants $a_1$ for each of the four features.

TABLE 3

Data used to calculate normalization constants for Feature1, Features2, Feature3, and Feature4.

| | Feature1 | | Feature2 | | Feature3 | | Feature4 | |
|---|---|---|---|---|---|---|---|---|
| | Mean | Standard Deviation | Mean | Standard Deviation | Mean | Standard Deviation | Mean | Standard Deviation |
| Object 1 | 741.94 | 39.66 | 232.77 | 43.57 | 3.597 | 3.23 | 3.29 | .587 |
| Object 2 | 518.07 | 34.37 | 159.91 | 32.40 | 4.64 | 3.26 | 3.36 | .6789 |
| Object 3 | 619.07 | 24.3 | 189.70 | 23.66 | 4.33 | 1.87 | 3.32 | .460 |
| Object 4 | 617.46 | 12.14 | 332.87 | 37.55 | 4.44 | 1.46 | 1.88 | .196 |
| Object 5 | 664.36 | 31.67 | 210.10 | 24.64 | 4.14 | 2.00 | 3.20 | .443 |
| Object 6 | 785.41 | 63.79 | 258.40 | 39.04 | 4.34 | 3.89 | 3.10 | .4928 |
| Object 7 | 754.41 | 30.46 | 277.98 | 42.78 | 2.79 | 1.66 | 2.79 | .5327 |
| Object 8 | 880.98 | 9.04 | 290.50 | 26.38 | 4.09 | 1.25 | 3.05 | .2170 |
| Average | | 30.67 | | 33.75 | | 2.33 | | .451 |
| Normalization Constants ($a_1$) | | 940.65 | | 1139.06 | | 5.43 | | .203 |

The FIGS. 19-25 show normalized scatter plots for Feature1, Feature2, Feature3, and Feature4. The plots illustrate the result of combining two or three path-independent features with normalization constants applied to the features. In most cases the combined normalized features form compact clusters corresponding to each object.

The FIGS. 26-35 show normalized distances plotted for Feature5, Feature6, Feature7, and Feature8. Multidimensional features are normalized as described in the foregoing. These figures show that for a given object, recurrences of that object plot near the origin.

Efficiency is defined to be the percentage of images of interest that are contained in a given percentage of the database. In the ideal case a user would see every image of interest before any extraneous images were returned by the system. In the worst case the user would be forced to view every extraneous image in the database before seeing any images of interest. The image indexing method was designed improve Efficiency to be significantly better than chance. The Average Efficiency characterizes the image indexing method. The Average Efficiency was obtained experimentally by averaging the Efficiency calculated for each object that traversed the field of view. Average Efficiency is summarized in the following tables of various combinations of features; the tables list the percentage of images of interest found within an index ranking equal to 10% of the total database.

Table 4 summarize the results for various combinations of Features 1-4.

TABLE 4

The percentage of images of interest ranked in the top 10% of the database. This table summarizes the Efficiency for combinations of Features1 through Feature4.

| Features | 10% Mark |
| --- | --- |
| Feature1 & Feature2 | 60% |
| Feature1 & Feature4 | 56% |
| Feature2 | 50% |
| Feature2 & Feature4 | 50% |
| Feature2 & Feature3 | 50% |
| Feature1 | 44% |
| Feature1 & Feature3 | 44% |
| Feature4 & Feature3 | 42% |
| Feature4 | 42% |
| Feature3 | 20% |
| Random | 10% |

Performance summaries for various combinations of Feature5, Feature6, Feature7, and Feature8 for the 10% mark are listed in table 5.

TABLE 5

The percentage of images of interest ranked in the top 10% of the database. This table summarizes the Efficiency for combinations of Features5 through Feature8.

| Features | 10% Mark |
| --- | --- |
| Feature6, Feature8, Feature7, & Feature5 | 66% |
| Feature6, Feature8, & Feature7 | 66% |
| Feature6, Feature8, & Feature5 | 66% |
| Feature7 & Feature8 | 65% |
| Feature5 & Feature8 | 62% |
| Feature6, Feature7, & Feature5 | 62% |

TABLE 5-continued

The percentage of images of interest ranked in the top 10% of the database. This table summarizes the Efficiency for combinations of Features5 through Feature8.

| Features | 10% Mark |
| --- | --- |
| Feature5 | |
| Feature7 & Feature5 | 61% |
| Feature6, Feature8, & Feature5 | 61% |
| Feature6 & Feature8 | 61% |
| Feature6 & Feature7 | 56% |
| Feature6 & Feature5 | 54% |
| Feature8 | 53% |
| Feature5 | 50% |
| Feature7 | 50% |
| Feature6 | 40% |

7. Modifications

The preferred embodiments may be modified in various ways while retaining the aspects of video object indexing with feature vectors plus grid block sequences reflecting objects' paths of traversing the field of view, and the query method of feature vector and grid block sequence similarity searching metrics (including color histogram) for finding objects of interest.

For example, the path-independent and the path-dependent features could be varied; the averaging of features over the sequence of images containing an object could include weightings reflecting the portion of the sequence or location in the grid; the features extracted in the grid blocks could be limited so the grid-block feature vector is primarily just a path indicator or only certain grid blocks would have associated features in the grid block feature vector, the median and high frequency filtering of features could be augmented or replaced by various frequency band or outlier emphasis filtering.

What is claimed is:

1. A method of searching for a video object in a video sequence of images, comprising:
    (a) providing a database of feature vectors of video objects;
    (b) providing a target feature vector;
    (c) comparing said target feature vector to each feature vector of said database;
    (d) ranking said feature vectors of said database according to the results of step (c); and
    (e) finding video objects by an association of video objects with said feature vectors of said database together with the results of step (d).

2. The method of claim 1, wherein:
    (a) said feature vectors of said database include both path-dependent and path-independent features extracted from video objects moving in sequences of images.

3. The method of claim 2, wherein:
    (a) said path-dependent features for a video object include a sequence of grid blocks traversed by said video object together with averages of features extracted from said video object when said video object was located in a corresponding grid block.

* * * * *